United States Patent
Andersen et al.

(10) Patent No.: US 11,252,977 B2
(45) Date of Patent: Feb. 22, 2022

(54) METHOD OF PRODUCING CONCENTRATED OR DRIED ACID-GELLABLE WHEY PROTEIN AGGREGATES, AND RELATED COMPOSITIONS AND FOOD PRODUCTS

(71) Applicant: Arla Foods Amba, Viby J (DK)

(72) Inventors: Mette Møller Andersen, Herning (DK); Søren Bang Nielsen, Herning (DK); Hans Bertelsen, Videbæk (DK)

(73) Assignee: Arla Foods Amba, Viby J (DK)

( * ) Notice: Subject to any disclaimer, the term of this patent is extended or adjusted under 35 U.S.C. 154(b) by 143 days.

(21) Appl. No.: 16/316,582

(22) PCT Filed: Jul. 14, 2017

(86) PCT No.: PCT/EP2017/067829
§ 371 (c)(1),
(2) Date: Jan. 9, 2019

(87) PCT Pub. No.: WO2018/011392
PCT Pub. Date: Jan. 18, 2018

(65) Prior Publication Data
US 2019/0239537 A1 Aug. 8, 2019

(30) Foreign Application Priority Data

Jul. 15, 2016 (EP) .................................... 16179713

(51) Int. Cl.
*A23J 3/08* (2006.01)
*A23C 21/00* (2006.01)
(Continued)

(52) U.S. Cl.
CPC .............. *A23J 3/08* (2013.01); *A23C 9/1425* (2013.01); *A23C 9/1427* (2013.01); *A23C 21/00* (2013.01); *A23C 21/10* (2013.01)

(58) Field of Classification Search
CPC ...... A23C 21/10; A23C 9/1427; A23C 9/1425; A23J 3/08
See application file for complete search history.

(56) References Cited

U.S. PATENT DOCUMENTS 4,720,390 A * 1/1988 Bachler ................. A23L 13/43
426/573
4,748,034 A * 5/1988 de Rham ............. A23C 9/1427
426/330.2
(Continued)

FOREIGN PATENT DOCUMENTS

EP 0520581 A1 12/1992
EP 1281322 A1 2/2003
(Continued)

OTHER PUBLICATIONS

Havea et al., "Heat-Induced Aggregation of Whey Protein: Comparison of Cheese WPC and Relevance of Mineral Composition" (J. Agric. Food Chem. 2002, 50, 4674-4681). (Year: 2002).*
(Continued)

*Primary Examiner* — Erik Kashnikow
*Assistant Examiner* — Assaf Zilbering
(74) *Attorney, Agent, or Firm* — Casimir Jones, S.C.; Lisa L. Mueller

(57) ABSTRACT

The present invention relates to a novel method for preparing acid-gellable whey protein aggregates in the form of concentrated suspensions or powders. Moreover, the present invention relates to a novel composition containing the acid-gellable whey protein aggregates, to a food product ingredient comprising the novel type of acid-gellable whey protein composition, and to a food product comprising the novel type of acid-gellable whey protein composition.

25 Claims, 2 Drawing Sheets

(51) Int. Cl.
*A23C 9/142* (2006.01)
*A23C 21/10* (2006.01)

(56) References Cited

U.S. PATENT DOCUMENTS

| | | | |
|---|---|---|---|
| 5,217,741 | A | 6/1993 | Kawachi et al. |
| 5,494,696 | A | 2/1996 | Holst et al. |
| 5,882,705 | A | 3/1999 | Sato et al. |
| 5,902,630 | A | 5/1999 | Imai et al. |
| 2002/0164401 | A1* | 11/2002 | Sato .......... A23J 3/08 426/41 |
| 2008/0305235 | A1* | 12/2008 | Gao .......... A23C 1/14 426/565 |
| 2009/0017176 | A1 | 1/2009 | Sugawara et al. |

FOREIGN PATENT DOCUMENTS

| | | |
|---|---|---|
| EP | 1839498 A1 | 10/2007 |
| EP | 1839504 A1 | 10/2007 |
| EP | 1929876 A1 | 6/2008 |
| GB | 2055846 A | 3/1981 |
| GB | 2063273 A | 6/1981 |
| WO | WO 2006/034856 A1 | 4/2006 |
| WO | WO 2006/034857 A2 | 4/2006 |
| WO | WO 2006/068521 A1 | 6/2006 |
| WO | WO 2007/108708 A1 | 9/2007 |
| WO | WO 2007/110411 | 10/2007 |
| WO | WO 2007/110421 | 10/2007 |
| WO | WO 2007/110421 A2 | 10/2007 |
| WO | WO 2008/032039 A2 | 3/2008 |
| WO | WO 2008/032039 A3 | 3/2008 |
| WO | WO 2015/059248 A1 | 3/2015 |
| WO | WO 2015/059243 | 4/2015 |
| WO | WO 2015/059243 A1 | 4/2015 |

OTHER PUBLICATIONS

Varunsatian et al., "Effects of Ca++, Mg++ and Na+ on Heat Aggregation of Whey Protein Concentrates" (Journal of Food Science—vol. 48 (1983)). (Year: 1983).*

Kuhn et al., "Mineral Salt Effects on Whey Protein Gelation". (Journal of Agricultural and Food Chemistry, vol. 39, No. 6 (Jun. 1991). (Year: 1991).*

Xiong., "Influence of pH and Ionic Environment on Thermal Aggregation of Whey Proteins" (J. Agric. Food Chem. 1992, 40, 380-384). (Year: 1992).*

Cavallieri & Cunha, "The effects of acidification rate, pH and ageing time on the acidic cold set gelation of whey proteins." Food Hydrocolloids May 2008, 22(3):439-448.

Alting et al., "Formation of disulfide bonds in acid-induced gels of preheated whey protein isolate." J Agric Food Chem. Oct. 2000; 48(10):5001-7.

Dissanayake et al., "Gelling Properties of Microparticulated Whey Proteins." Journal of Agricultural and Food Chemistry Jun. 2010, 58(11):6825-32.

Walstra et al., Dairy Science and Technology, second edition, 2006.

Notice of Opposition filed against EP Patent No. 3484304 B1 dated May 27, 2021 by FrieslandCampina Nederland B.V., 11 pages.

Response filed by opponent in the opposition of EP Patent 3484304, dated Dec. 13, 2021, 6 pages.

Response to Notice of Opposition filed by the proprietor in the opposition of EP Patent 3484304 dated Oct. 27, 2021, 20 pages.

De Wit, "Lecturer's Handbook on whey and whey products" First Ed, chapter 5, 2001, European Whey Products Association, Brussels, Belgium.

* cited by examiner

METHOD OF PRODUCING CONCENTRATED OR DRIED ACID-GELLABLE WHEY PROTEIN AGGREGATES, AND RELATED COMPOSITIONS AND FOOD PRODUCTS

CROSS-REFERENCE TO RELATED APPLICATIONS

This application is a national phase application under 35 U.S.C. § 371 of PCT International Application No. PCT/EP2017/067829, filed Jul. 14, 2017, which claims priority to European Application No. 16179713.9, filed Jul. 15, 2016, each of which are hereby incorporated by reference in its entirety.

FIELD OF THE INVENTION

The present invention relates to a novel method for preparing acid-gellable whey protein aggregates in the form of concentrated suspensions or powders. Moreover, the present invention relates to a novel composition containing the acid-gellable whey protein aggregates, to a food product ingredient comprising the novel type of acid-gellable whey protein composition, and to a food product comprising the novel type of acid-gellable whey protein composition.

BACKGROUND

Whey protein is known to be a high quality protein source for human nutrition and is useful as a nutritional supplement for persons in need for extra protein.

It is known that whey proteins denature when subjected to sufficient heat-treatment and it is also known that some denatured whey proteins possess gelling properties and that gelling of a solution comprising denatured whey proteins can be induced by acidification, by addition of salt and/or by heating the solution.

U.S. Pat. No. 5,217,741 describes a solution containing denatured whey protein which undergoes gelation by the addition of salt.

U.S. Pat. No. 5,902,630 describes a water soluble processed whey protein powder produced by combining a partial heat-denatured whey protein with a non-denatured whey protein.

WO 2006/034856 describes activated globular protein preparations which can be used as a gelling agent, a thickening agent, an emulsifying agent, a stabilizing agent, a whipping agent, a protein supplement and/or a gelatin substitute. The gelation properties of the activated globular whey protein preparations can be induced by addition of acid.

US 2008/0305235 describes a modified whey protein concentrate which comprises denatured whey proteins and is capable of cold-gellation upon addition of salts. An important teaching of US 2008/0305235 is that the whey protein concentration should be kept low during denaturation and that the temperature of concentrated suspensions of modified whey protein concentrate should be kept above 40 degrees C.

WO 2008/032039 A2 discloses a method of monitoring the degree of protein denaturation and aggregation during heat treatment in order to control the degree of denaturation and particles size of the obtained denatured whey protein particles. The examples of WO 2008/032039 A2 pertain to measuring and controlling microparticulation of whey protein and egg protein and neither discuss nor characterize the presence of acid-gellable whey protein aggregates. The protein concentration of the whey protein feeds of the Examples are typically approx. 20% and therefore favour formation of microparticles rather than acid-gellable whey protein aggregates. Demineralization and removal of divalent cations is not mentioned and this furthermore indicates that the amount of acid-gellable whey protein aggregates is very low, if present at all.

WO 2015/059248 A1 discloses a high protein, acidified dairy product comprising a denatured whey protein composition and the composition itself. The denatured whey protein composition contains a total amount of protein of at least 60% (w/w), a total amount of fat of at most 3% (w/w) and insoluble whey protein particles having a particle size in the range of 1-10 micron, where the amount of insoluble whey protein particles is in the range of 50-100% relative to the total amount of protein. The denatured whey proteins are prepared by heat treating a solution comprising at least 1% (w/w) whey proteins and having a pH of 5-7 at 70-160 degrees C. for sufficient time to form the insoluble whey protein particles (typically from 1 second to 30 minutes).

However, the insoluble whey protein particles of WO 2015/059248 A1 are not acid-gellable whey protein aggregates, and WO 2015/059248 A1 neither contains teachings relating to the challenges of preparing whey protein compositions containing a high concentration acid-gellable whey protein aggregates nor any discussions of acid-gellable whey protein aggregates as such.

SUMMARY OF THE INVENTION

The present inventors have discovered that surprisingly it is possible to handle concentrated suspensions of acid-gellable whey protein aggregates at low temperature without excessive aggregation. This opens up for simpler processing with less risk of microbial contamination in the acid-gellable whey protein composition obtained from the process.

Thus, an aspect of the invention pertains to a method of preparing an acid-gellable whey protein composition said method comprising the steps of:
a) providing a demineralised solution comprising 1-15% (w/w) native, denaturable whey protein and having a pH in the range of 6-9,
b) heat-treating the demineralised solution of step a) to a temperature of at least 68 degrees C. for at most 2 hours, thereby obtaining a suspension comprising acid-gellable whey protein aggregates,
c) cooling the suspension of step b) to a temperature of at most 30 degrees C.,
d) concentrating the suspension obtained in step c) to a concentration of acid-gellable whey protein aggregates of at least 4% (w/w),
e) optionally, drying the concentrated suspension,
wherein:
the temperature of the concentrated suspension of step d) is maintained at at most 30 degrees C. until the concentrated suspension is either subjected to the drying of step e) or another use, and
the duration between the concentration of step d) and the drying of step e) or other use of the concentrated suspension is at most 48 hours.

For example, an aspect of the invention pertains to a method of preparing an acid-gellable whey protein composition said method comprising the steps of:
a) providing a demineralised solution comprising 1-15% (w/w) native, denaturable whey protein and having a pH in the range of 6-9, b) heat-treating the demineralised solution of step a) to a temperature of at least 68 degrees C. for at most 2 hours, thereby obtaining a suspension comprising acid-gellable whey protein aggregates, c) cooling the suspension of step b) to a temperature of at most 30 degrees C., d) concentrating the suspension obtained in step c) to a concentration of acid-gellable whey protein aggregates of at least 4% (w/w), e) drying the concentrated suspension, wherein:

the temperature of the concentrated suspension of step d) is maintained at at most 30 degrees C. until the concentrated suspension is subjected to the drying of step e), and the duration between the concentration of step d) and the drying of step e) is at most 48 hours.

Another aspect of the invention pertains to a method of preparing a food product said method comprising the steps of:

a) providing a demineralised solution comprising 1-15% (w/w) native, denaturable whey protein and having a pH in the range of 6-9, b) heat-treating the demineralised solution of step a) to a temperature of at least 68 degrees C. for at most 2 hours, thereby obtaining a suspension comprising acid-gellable whey protein aggregates, c) cooling the suspension of step b) to a temperature of at most 30 degrees C., d) concentrating the suspension obtained in step c) to a concentration of acid-gellable whey protein aggregates of at least 4% (w/w), and subsequently using the concentrated suspension of acid-gellable whey protein aggregates of step d) as an ingredient in the production of the food product, wherein:

the temperature of the concentrated suspension of step d) is maintained at at most 30 degrees C. until the subsequent use of the concentrated suspension, and the duration between the concentration of step d) and the subsequent use of the concentrated suspension is at most 48 hours.

Another aspect of the present invention pertains to an acid-gellable whey protein powder composition, which is obtainable by said novel method. In particular the present invention pertains to an acid-gellable whey protein powder composition having a total amount of protein of at least 60% (w/w) relative to the dry weight of the powder composition and comprising 40-100% (w/w) denatured whey protein particles relative to the total amount of protein, wherein at least 50% (w/w) of the denatured whey protein particles are acid-gellable whey protein aggregates.

A further aspect of the present invention pertains to an acid-gellable whey protein suspension, which is obtainable by said novel method. In particular the present invention pertains to an acid-gellable whey protein suspension having a total amount of protein of at least 5% (w/w) relative to the total amount of suspension and comprising 40-100% (w/w) denatured whey protein particles relative to the total amount of protein, wherein at least 50% (w/w) of the denatured whey protein particles are acid-gellable whey protein aggregates.

Yet another aspect of the present invention pertains to a food ingredient, which comprises said acid-gellable whey protein powder composition or said acid-gellable whey protein suspension.

In yet a further aspect the present invention pertains to a food product, which comprises said acid-gellable whey protein powder composition or said acid-gellable whey protein suspension.

In yet another aspect the present invention relates to a method of producing a food product. The method comprises the steps of:

1) providing an acid-gellable whey protein powder composition or an acid-gellable whey protein suspension as described herein, 2) combining the acid-gellable whey protein with one or more additional ingredients, and 3) optionally processing the combination.

DETAILED DESCRIPTION OF THE INVENTION

Figure 1:
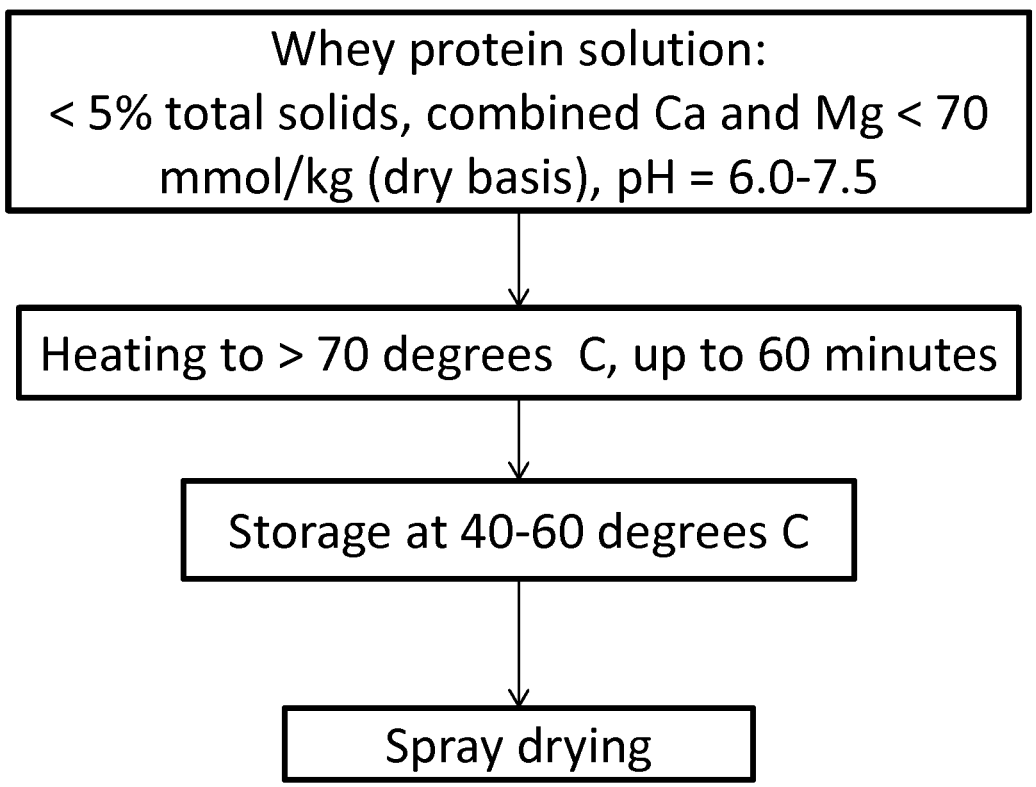
FIG. 1 shows a flow diagram of an embodiment of the method according to the present invention.
Figure 2:
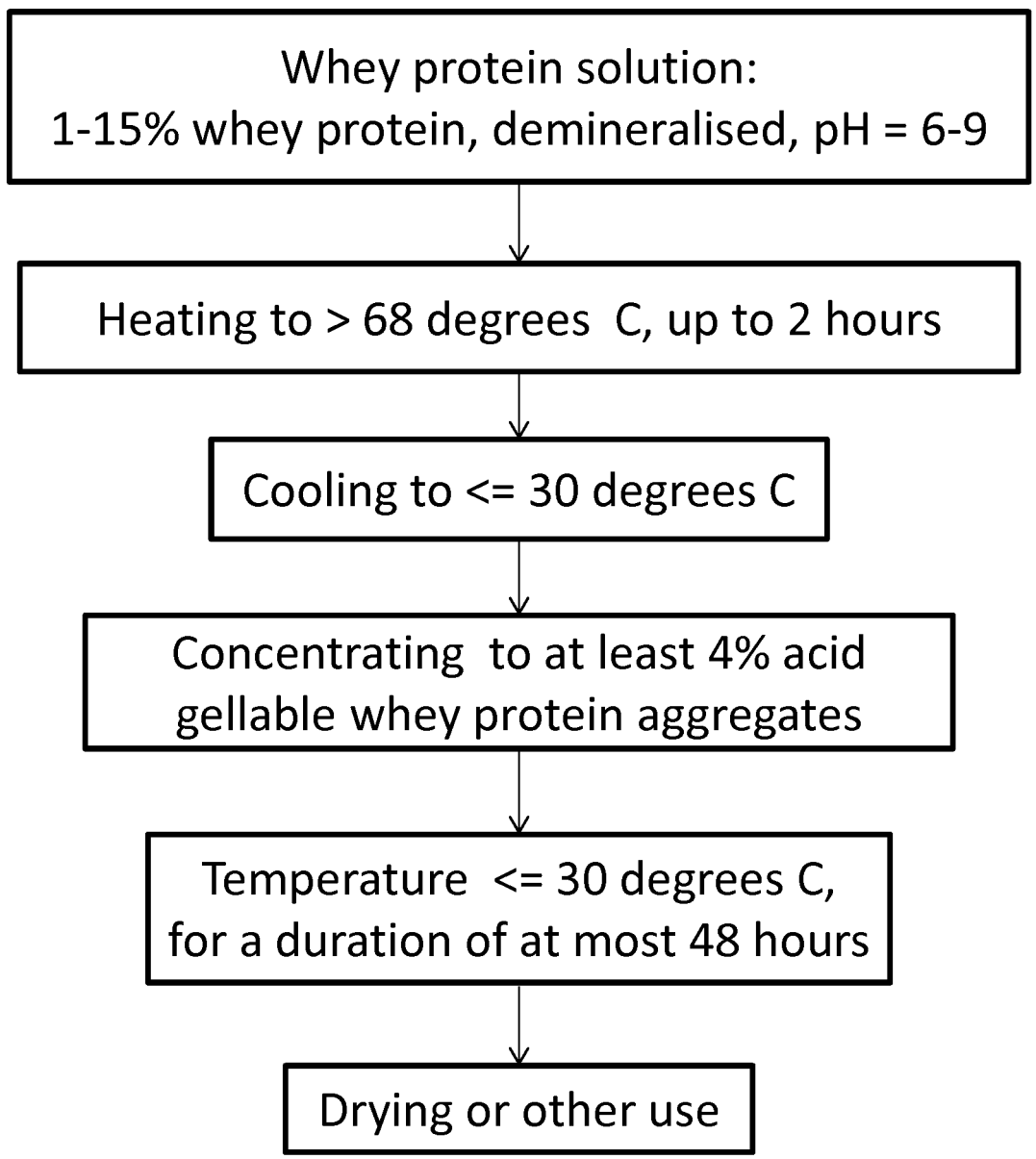
FIG. 2 shows a flow diagram of the prior art method disclosed in US 2008/0305235.

As said, an aspect of the invention pertains to a method of preparing an acid-gellable whey protein composition said method comprising the steps of:

a) providing a demineralised solution comprising 1-15% (w/w) native, denaturable whey protein and having a pH in the range of 6-9, b) heat-treating the demineralised solution of step a) to a temperature of at least 68 degrees C. for at most 2 hours, thereby obtaining a suspension comprising acid-gellable whey protein aggregates, c) cooling the suspension of step b) to a temperature of at most 30 degrees C., d) concentrating the suspension obtained in step c) to a concentration of acid-gellable whey protein aggregates of at least 4% (w/w), e) optionally, drying the concentrated suspension, wherein:

the temperature of the concentrated suspension of step d) is maintained at at most 30 degrees C. until the concentrated suspension is either subjected to the drying of step e) or another use, and the duration between the concentration of step d) and the drying of step e) or other use of the concentrated suspension is at most 48 hours.

For example, an aspect of the invention pertains to a method of preparing an acid-gellable whey protein composition said method comprising the steps of:

a) providing a demineralised solution comprising 1-15% (w/w) native, denaturable whey protein and having a pH in the range of 6-9, b) heat-treating the demineralised solution of step a) to a temperature of at least 68 degrees C. for at most 2 hours, thereby obtaining a suspension comprising acid-gellable whey protein aggregates, c) cooling the suspension of step b) to a temperature of at most 30 degrees C., d) concentrating the suspension obtained in step c) to a concentration of acid-gellable whey protein aggregates of at least 4% (w/w), e) drying the concentrated suspension, wherein:

the temperature of the concentrated suspension of step d) is maintained at at most 30 degrees C. until the concentrated suspension is subjected to the drying of step e), and the duration between the concentration of step d) and the drying of step e) is at most 48 hours.

Another aspect of the invention pertains to a method of preparing a food product said method comprising the steps of:

a) providing a demineralised solution comprising 1-15% (w/w) native, denaturable whey protein and having a pH in the range of 6-9,
b) heat-treating the demineralised solution of step a) to a temperature of at least 68 degrees C. for at most 2 hours, thereby obtaining a suspension comprising acid-gellable whey protein aggregates,
c) cooling the suspension of step b) to a temperature of at most 30 degrees C.,
d) concentrating the suspension obtained in step c) to a concentration of acid-gellable whey protein aggregates of at least 4% (w/w), and subsequently using the concentrated suspension of acid-gellable whey protein aggregates of step d) as an ingredient in the production of the food product,
wherein:
the temperature of the concentrated suspension of step d) is maintained at at most 30 degrees C. until the subsequent use of the concentrated suspension, and
the duration between the concentration of step d) and the subsequent use of the concentrated suspension is at most 48 hours.

In the context of the present invention, the term "acid-gellable whey protein aggregate" pertains to aggregates of denatured whey proteins, which aggregates are capable of forming strong gels (much stronger than native whey protein) during acidification and which aggregates may e.g. have linear, worm-like, branched or chain-like shapes. Acid-gellable whey protein aggregate as such are well-known in the art and are e.g. discussed in U.S. Pat. No. 5,902,630, WO 2006/034856, and US 2008/0305235. The acid-gellable whey protein aggregates are obtainable by heat-denaturation of a demineralised whey protein solution having a pH in the range of 6-9 at a temperature of at least 68 degrees C. for at most 2 hours with or without shear forces acting on the whey protein during the denaturation. Acid-gellable whey protein aggregates are quantified as described in Example 1.1.

In the context of the present invention, the term "duration" pertains to the mean duration that an acid-gellable whey protein aggregate is in the concentrated suspension. In a continuous system the duration is calculated as the average volumetric flow rate of the concentrated suspension divided by the inner volume of the conduits that connect the concentration unit with the drying unit. When steps d) and e) are operated in batch mode the mean duration pertains to the mean residence time of an acid-gellable whey protein aggregate between the concentrate side of the concentration unit and the drying unit. The mean residence time may e.g. be provided by the system provider or determined experimentally by injecting tracers into the process stream at the concentrate side of the concentration unit.

In step a, a demineralised solution comprising whey proteins and having a pH of 6-9 is provided.

In the context of the present invention, the term "whey protein" relates to the proteins which are present in the serum phase of either milk or coagulated milk. The proteins of the serum phase of milk are also sometimes referred to as milk serum proteins or ideal whey. When used herein the term "whey protein" both encompasses the native whey proteins and whey protein in denatured and/or aggregated form.

In the context of the present invention, the term "whey" relates to the liquid composition which is left when casein has been removed from milk. Casein may e.g. be removed by microfiltration providing a liquid permeate which is free of or essentially free of micellar casein but contains the native whey proteins. This liquid permeate is sometimes referred to as ideal whey, serum or milk serum.

Alternatively, the casein may be removed from milk by contacting a milk composition with rennet enzyme, which cleavages kappa-casein into para-kappa-casein and the peptide caseinomacropeptide (CMP), thereby destabilising the casein micelles and causing casein to precipitate. The liquid surrounding the rennet precipitated casein is often referred to as sweet whey and contains CMP in addition to the whey proteins which are normally found in milk.

Casein may also be removed from milk by acid precipitation, i.e. reducing the pH of the milk below pH 4.6 which is the isoelectric point of casein and which causes the casein micelles to disintegrate and precipitate. The liquid surrounding the acid precipitated casein is often referred to as acid whey or casein whey and does not contain CMP.

In the context of the present invention, the term "native whey protein" pertains to native alpha-lactalbumin, native beta-lactoglobulin and/or native CMP as defined herein. The total amount of native whey protein pertains to the sum of native alpha-lactalbumin, native beta-lactoglobulin and native CMP. The total amount of native whey protein is determined according to Example 1.2. Native whey protein can for example be found in native sweet whey, native acid whey or native milk serum or in protein concentrates of these whey sources.

The term "native, denaturable whey protein" pertains to native alpha-lactalbumin and native beta-lactoglobulin, but not native CMP.

The native whey protein may for example have a proportion between native alpha-lactalbumin, native beta-lactoglobulin and native CMP which is substantially the same as the proportion found in the original whey protein source.

In some preferred embodiments of the invention, the native, denaturable whey protein of the demineralised solution comprises at least 25% (w/w) beta-lactoglobulin relative to the total amount of native, denaturable whey protein, preferable at least 40% (w/w) beta-lactoglobulin, and even more preferably at least 60% (w/w) beta-lactoglobulin relative to the total amount of native, denaturable whey protein. For example, the native, denaturable whey protein of the demineralised solution comprises at least 70% (w/w) beta-lactoglobulin relative to the total amount of native, denaturable whey protein, preferable at least 80% (w/w) beta-lactoglobulin, and even more preferably at least 90% (w/w) beta-lactoglobulin relative to the total amount of native, denaturable whey protein.

The native, denaturable whey protein of the demineralised solution may e.g. comprise in the range of 25-100% (w/w) beta-lactoglobulin and in the range of 0-75% (w/w) alpha-lactalbumin relative to the total amount of native, denaturable whey protein. Preferably, the native, denaturable whey protein of the demineralised solution may comprise in the range of 40-98% (w/w) beta-lactoglobulin and in the range of 2-60% (w/w) alpha-lactalbumin relative to the total amount of native, denaturable whey protein. Even more preferably, the native, denaturable whey protein of the demineralised solution may comprise in the range of 70-95% (w/w) beta-lactoglobulin and in the range of 5-30% (w/w) alpha-lactalbumin relative to the total amount of native, denaturable whey protein.

The native whey protein may be provided using a number of different whey protein sources known within the art. In one embodiment the native whey protein is provided by a protein source selected from the group consisting of a native whey protein concentrate, a native whey protein isolate, a native alpha-lactalbumin isolate, a native beta-lactoglobulin isolate, and mixtures thereof. It is preferred that the dry matter content of native whey protein source is high especially in cases where the mixed cooled suspension is further subjected to a drying step because less energy is then required to remove the water during the drying process.

In the context of the present invention, the terms "native alpha-lactalbumin", "native beta-lactoglobulin", and "native CMP", pertain to alpha-lactalbumin, beta-lactoglobulin and CMP which have approximately the same retention time as the standards of alpha-lactalbumin, beta-lactoglobulin and CMP, respectively, when assayed according to Example 1.2. The native whey protein species have not been subjected to heat-treatment which has caused them to form whey protein aggregates, for example by means of non-native covalent bonds.

It should be noted that the terms "native alpha-lactalbumin", "native beta-lactoglobulin", and "native CMP" may also include glycosylated and/or phosphorylated variants of alpha-lactalbumin, beta-lactoglobulin and CMP, respectively.

The whey proteins used in the present invention are preferably whey proteins from mammalian milk, and even preferably from ruminant milk, such as e.g. milk from cow, sheep, goat, buffalo, camel, llama, horse and/or deer. In some preferred embodiments of the invention the whey proteins are bovine whey proteins.

In some embodiments, the demineralised solution comprises 1-15% (w/w) native, denaturable whey protein, such as for example 2-12% (w/w) native, denaturable whey protein, preferably 3-10% (w/w) native, denaturable whey protein, such as for example 4-8% (w/w) native, denaturable whey protein, preferably 5-6% (w/w) native, denaturable whey protein.

Preferably, the demineralised solution comprises in the range of 3-15% (w/w) native, denaturable whey protein, such as e.g. in the range of 3-12% (w/w) native, denaturable whey protein or in the range of 3-10% (w/w) native, denaturable whey protein. Even more preferably, the demineralised solution comprises in the range of 5-15% (w/w) native, denaturable whey protein.

In some embodiments, the demineralised solution comprises at most 15% (w/w) native, denaturable whey protein, such as for example at most 12% (w/w) native, denaturable whey protein, such as for example at most 10% (w/w) native, denaturable whey protein, such as for example at most 8% (w/w) native, denaturable whey protein, such as for example at most 6% (w/w) native, denaturable whey protein.

In some preferred embodiments of the invention, the demineralised solution comprises in the range of 1-5% (w/w) native, denaturable whey protein, such as e.g. in the range of 1-4% (w/w) native, denaturable whey protein or in the range of 2-5% (w/w) native, denaturable whey protein.

In some embodiments, the whey protein may be provided by a protein source selected from the group consisting of a native whey protein concentrate, a native whey protein isolate, a native alpha-lactalbumin isolate, a native beta-lactoglobulin isolate, and mixtures thereof.

In some embodiments, the demineralised solution comprises at most 10% (w/w) casein relative to the total amount of protein, preferably at most 8% (w/w) casein, more preferably at most 6% (w/w) casein, and even more preferred at most 4% (w/w) casein relative to the total amount of protein.

Even lower amounts of casein in the demineralised solution may be preferred. Thus, the demineralised solution may e.g. comprise at most 3% (w/w) casein relative to the total amount of protein, preferably at most 2% (w/w) casein, more preferably at most 1% (w/w) casein, and even more preferred at most 0.2% (w/w) casein relative to the total amount of protein.

The presence of free salt ions influence the folding and aggregative properties of proteins and it has been observed that the presence of ions promotes the aggregation and gel formation of whey protein upon heating. The process is therefore carried out using a demineralised whey protein solution as the feed solution.

In the context of the present invention, the term "demineralised solution" pertains to a solution having a total amount of free Ca and free Mg of at most 120 mmol/kg dry weight.

The demineralised whey protein solution may be obtained by using any known desalting treatment. Hence, in some embodiments, the demineralised solution is provided by subjecting a whey protein solution to ultrafiltration, nanofiltration, precipitation and/or ion exchange. In cases where ultrafiltration and/or nanofiltration is employed these filtration processes are preferably carried out using the diafiltration mode.

Alternatively, the demineralised whey protein solution may be obtained by dissolving a demineralised whey protein powder in water having a low content of calcium and magnesium ions, such as for example demineralised water.

In some embodiments, the total amount of combined calcium and magnesium in the demineralised solution is at most 120 mmol/kg dry weight, such as at most 100 mmol/kg dry weight, such as at most 80 mmol/kg dry weight, such as at most 50 mmol/kg dry weight, such as at most 30 mmol/kg dry weight, such as at most 20 mmol/kg dry weight, such as at most 10 mmol/kg dry weight.

In other embodiments the total amount of combined calcium and magnesium in the demineralised solution is in the range of 0.1-120 mmol/kg dry weight, such as 0.1-100 mmol/kg dry weight, such as 0.1-50 mmol/kg dry weight, such as 0.1-20 mmol/kg dry weight, such as 0.1-10 mmol/kg dry weight, such as 0.1-5 mmol/kg dry weight.

In yet other embodiments, the total amount of combined calcium and magnesium in the demineralised solution may be markedly higher without negatively affecting the aggregative properties of the whey proteins because calcium and magnesium is present in non-free form such as for example as bound in complexes, for example in chelation complexes, or bound in insoluble salts, for example as calcium phosphate. In such embodiments the total amount of combined calcium and magnesium in the demineralised solution may be very high, and even higher than the total amount in the starting whey protein solution before the starting whey protein solution is demineralised, such as for example 5 times higher as compared with the starting whey protein solution before the starting whey protein solution is demineralised.

In the context of the present invention, the term "total amount of combined calcium and magnesium" pertains to the sum of the total amount of calcium and the total amount of magnesium.

In the context of the present invention, the term "total amount of calcium" pertains to the total amount of calcium including both bound and free calcium ions present in the product or composition in question. The total amount of calcium can be determined as disclosed in Example 1.11.2.

In the context of the present invention, the term "total amount of magnesium" pertains to the total amount of magnesium including both bound and free magnesium ions present in the product or composition in question. The total amount of magnesium can be determined as disclosed in Example 1.11.2.

In some embodiments, the total amount of calcium in the demineralised solution is at most 4000 mg/kg dry weight, such as for example at most 2000 mg/kg dry weight, such as for example at most 1000 mg/kg dry weight, such as for example at most 500 mg/kg dry weight, such as for example at most 250 mg/kg dry weight, such as for example at most 100 mg/kg dry weight, such as for example at most 50 mg/kg dry weight.

In other embodiments, the total amount of calcium in the demineralised solution is at most 30 mg/kg dry weight, such as for example at most 25 mg/kg dry weight, such as for example at most 20 mg/kg dry weight, such as for example at most 15 mg/kg dry weight, such as for example at most 10 mg/kg dry weight, such as for example at most 5 mg/kg dry weight.

In some embodiments, the total amount of calcium in the demineralised solution is 10-4000 mg/kg dry weight, such as for example 10-2000 mg/kg dry weight, such as for example 20-1000 mg/kg dry weight, such as for example 20-500 mg/kg dry weight, such as for example 20-200 mg/kg dry weight.

In yet other embodiments, the total amount of calcium in the demineralised solution is 50-1000 mg/kg dry weight, such as for example 100-1000 mg/kg dry weight, such as for example 250-1000 mg/kg dry weight, such as for example 500-1000 mg/kg dry weight, such as for example 750 mg/kg dry weight.

In other embodiments, the total amount of calcium in the demineralised solution is 20-400 mg/kg dry weight, such as for example 20-300 mg/kg dry weight, such as for example 50-250 mg/kg dry weight, such as for example 50-200 mg/kg dry weight. In yet other embodiments the total amount of calcium in the demineralised solution is 50-150 mg/kg dry weight, such as for example 75-150 mg/kg dry weight, such as for example 75-125 mg/kg dry weight, such as for example 100 mg/kg dry weight.

In yet other embodiments, the total amount of calcium in the demineralised solution is 5-50 mg/kg dry weight, such as for example 10-40 mg/kg dry weight, such as for example 20-30 mg/kg dry weight. In yet other embodiments the total amount of calcium in the demineralised solution is 10-50 mg/kg dry weight, such as for example 15-50 mg/kg dry weight, such as for example 20-50 mg/kg dry weight, such as for example 10-40 mg/kg dry weight, such as for example 10-30 mg/kg dry weight, such as for example 10-20 mg/kg dry weight, such as for example 15 mg/kg dry weight.

In some embodiments, the total amount of magnesium in the demineralised solution is at most 2000 mg/kg dry weight, such as for example at most 1000 mg/kg dry weight, such as for example at most 500 mg/kg dry weight, such as for example at most 250 mg/kg dry weight, such as for example at most 100 mg/kg dry weight, such as for example at most 50 mg/kg dry weight.

In other embodiments, the total amount of magnesium in the demineralised solution is at most 30 mg/kg dry weight, such as for example at most 25 mg/kg dry weight, such as for example at most 20 mg/kg dry weight, such as for example at most 15 mg/kg dry weight, such as for example at most 10 mg/kg dry weight, such as for example at most 5 mg/kg dry weight.

In some embodiments, the total amount of magnesium in the demineralised solution is 20-2000 mg/kg dry weight, such as for example 20-1000 mg/kg dry weight, such as for example 20-500 mg/kg dry weight, such as for example 20-200 mg/kg dry weight. In yet other embodiments the total amount of magnesium in the demineralised solution is 50-1000 mg/kg dry weight, such as for example 100-1000 mg/kg dry weight, such as for example 250-1000 mg/kg dry weight, such as for example 500-1000 mg/kg dry weight, such as for example 750 mg/kg dry weight.

In other embodiments, the total amount of magnesium in the demineralised solution is 20-400 mg/kg dry weight, such as for example 20-300 mg/kg dry weight, such as for example 50-250 mg/kg dry weight, such as for example 50-200 mg/kg dry weight. In yet other embodiments the total amount of magnesium in the demineralised solution is 50-150 mg/kg dry weight, such as for example 75-150 mg/kg dry weight, such as for example 75-125 mg/kg dry weight, such as for example 100 mg/kg dry weight.

In yet other embodiments, the total amount of magnesium in the demineralised solution is 5-50 mg/kg dry weight, such as for example 10-40 mg/kg dry weight, such as for example 20-30 mg/kg dry weight. In yet other embodiments the total amount of magnesium in the demineralised solution is 10-50 mg/kg dry weight, such as for example 15-50 mg/kg dry weight, such as for example 20-50 mg/kg dry weight, such as for example 10-40 mg/kg dry weight, such as for example 10-30 mg/kg dry weight, such as for example 10-20 mg/kg dry weight, such as for example 15 mg/kg dry weight.

In some embodiments, the total amount of free calcium in the demineralised solution is at most 2000 mg/kg dry weight, such as for example at most 1000 mg/kg dry weight, such as for example at most 500 mg/kg dry weight, such as for example at most 250 mg/kg dry weight, such as for example at most 100 mg/kg dry weight, such as for example at most 50 mg/kg dry weight.

In other embodiments, the total amount of free calcium in the demineralised solution is at most 30 mg/kg dry weight, such as for example at most 25 mg/kg dry weight, such as for example at most 20 mg/kg dry weight, such as for example at most 15 mg/kg dry weight, such as for example at most 10 mg/kg dry weight, such as for example at most 5 mg/kg dry weight.

In some embodiments, the total amount of free calcium in the demineralised solution is 1-2000 mg/kg dry weight, such as for example 1-1000 mg/kg dry weight, such as for example 1-500 mg/kg dry weight, such as for example 1-200 mg/kg dry weight. In yet other embodiments the total amount of free calcium in the demineralised solution is 5-1000 mg/kg dry weight, such as for example 10-1000 mg/kg dry weight, such as for example 50-1000 mg/kg dry weight, such as for example 500-1000 mg/kg dry weight.

In other embodiments, the total amount of free calcium in the demineralised solution is 1-50 mg/kg dry weight, such as for example 10-40 mg/kg dry weight, such as for example 20-30 mg/kg dry weight. In yet other embodiments the total amount of free calcium in the demineralised solution is 10-50 mg/kg dry weight, such as for example 15-50 mg/kg dry weight, such as for example 20-50 mg/kg dry weight, such as for example 10-40 mg/kg dry weight, such as for example 10-30 mg/kg dry weight, such as for example 10-20 mg/kg dry weight.

In some embodiments, the total amount of free magnesium in the demineralised solution is at most 2000 mg/kg dry weight, such as for example at most 1000 mg/kg dry weight, such as for example at most 500 mg/kg dry weight, such as for example at most 250 mg/kg dry weight, such as for example at most 100 mg/kg dry weight, such as for example at most 50 mg/kg dry weight.

In other embodiments, the total amount of free magnesium in the demineralised solution is at most 30 mg/kg dry weight, such as for example at most 25 mg/kg dry weight, such as for example at most 20 mg/kg dry weight, such as for example at most 15 mg/kg dry weight, such as for example at most 10 mg/kg dry weight, such as for example at most 5 mg/kg dry weight.

In some embodiments, the total amount of free magnesium in the demineralised solution is 1-2000 mg/kg dry weight, such as for example 1-1000 mg/kg dry weight, such as for example 1-500 mg/kg dry weight, such as for example 1-200 mg/kg dry weight. In yet other embodiments the total amount of free magnesium in the demineralised solution is 5-1000 mg/kg dry weight, such as for example 10-1000 mg/kg dry weight, such as for example 50-1000 mg/kg dry weight, such as for example 500-1000 mg/kg dry weight.

In other embodiments, the total amount of free magnesium in the demineralised solution is 1-50 mg/kg dry weight, such as for example 10-40 mg/kg dry weight, such as for example 20-30 mg/kg dry weight. In yet other embodiments the total amount of free magnesium in the demineralised solution is 10-50 mg/kg dry weight, such as for example 15-50 mg/kg dry weight, such as for example 20-50 mg/kg dry weight, such as for example 10-40 mg/kg dry weight, such as for example 10-30 mg/kg dry weight, such as for example 10-20 mg/kg dry weight.

In the context of the present invention the term "total amount of free calcium" pertains to the content of free calcium ions and can be determined as described in Example 1.9.1.

In the context of the present invention, the term "total amount of free magnesium" pertains to the content of free magnesium ions and can be determined as described in Example 1.9.2.

During demineralisation of the whey protein solution pH may change because of the removal of ions. Hence, an adjustment of pH of the demineralised solution may be necessary. The solution pH adjustment is typically carried out using a food grade acid or base such as e.g. KOH, NaOH, HCl, citric acid or other acids or bases that only contains monovalent cations so that addition of divalent cations is avoided.

In some embodiments, pH of the demineralised solution is adjusted to 6-9, such as for example 6.0-9.0, such as for example 6.0-8.0, such as for example 6.0-7.5, such as for example 6.5-7.5, such as for example 6.7-7.3.

In other embodiments, pH of the demineralised solution is adjusted to 6.0-7.8, such as for example 6.0-7.6, such as for example 6.0-7.4, such as for example 6.0-7.2, such as for example 6.0-7.0, such as for example 6.0-6.8, such as for example 6.0-6.6, such as for example 6.0-6.4, such as for example 6.0-6.2.

In some other embodiments, pH of the demineralised solution is adjusted to 6.2-8.0, such as for example 6.4-8.0, such as for example 6.6-8.0, such as for example 6.8-8.0, such as for example 7.0-8.0, such as for example 7.2-8.0, such as for example 7.4-8.0, such as for example 7.6-8.0, such as for example 7.8-8.0.

In yet other embodiments, pH of the demineralised solution is adjusted to 6.0-6.2, such as for example 6.2-6.4, such as for example 6.4-6.6, such as for example 6.6-6.8, such as for example 6.8-7.0, such as for example 7.0-7.2, such as for example 7.2-7.4, such as for example 7.4-7.6, such as for example 7.6-7.8, such as for example 7.8-8.0.

In some embodiments, the total amount of total calcium in the demineralised solution is 20-4000 mg/kg dry weight and pH is adjusted to 6.0-6.2.

In some embodiments, the total amount of total calcium in the demineralised solution is 20-4000 mg/kg dry weight and pH is adjusted to 6.2-6.4.

In some embodiments, the total amount of total calcium in the demineralised solution is 20-4000 mg/kg dry weight and pH is adjusted to 6.4-6.6.

In some embodiments, the total amount of total calcium in the demineralised solution is 20-4000 mg/kg dry weight and pH is adjusted to 6.6-6.8.

In some embodiments, the total amount of total calcium in the demineralised solution is 20-4000 mg/kg dry weight and pH is adjusted to 6.8-7.0.

In some embodiments, the total amount of total calcium in the demineralised solution is 20-4000 mg/kg dry weight and pH is adjusted to 7.0-7.2.

In some embodiments, the total amount of total calcium in the demineralised solution is 20-4000 mg/kg dry weight and pH is adjusted to 7.2-7.4.

In some embodiments, the total amount of total calcium in the demineralised solution is 20-4000 mg/kg dry weight and pH is adjusted to 7.4-7.6.

In some embodiments, the total amount of total calcium in the demineralised solution is 20-4000 mg/kg dry weight and pH is adjusted to 7.6-7.8.

In some embodiments, the total amount of total calcium in the demineralised solution is 20-4000 mg/kg dry weight and pH is adjusted to 7.8-8.0.

In some embodiments, the total amount of total calcium in the demineralised solution is 20-4000 mg/kg dry weight and pH is adjusted to 8.0-8.5.

In some embodiments, the total amount of total calcium in the demineralised solution is 20-4000 mg/kg dry weight and pH is adjusted to 8.5-9.0.

In some embodiments, the total amount of total calcium in the demineralised solution is 20-2000 mg/kg dry weight and pH is adjusted to 6.0-6.2.

In some embodiments, the total amount of total calcium in the demineralised solution is 20-2000 mg/kg dry weight and pH is adjusted to 6.2-6.4.

In some embodiments, the total amount of total calcium in the demineralised solution is 20-2000 mg/kg dry weight and pH is adjusted to 6.4-6.6.

In some embodiments, the total amount of total calcium in the demineralised solution is 20-2000 mg/kg dry weight and pH is adjusted to 6.6-6.8.

In some embodiments, the total amount of total calcium in the demineralised solution is 20-2000 mg/kg dry weight and pH is adjusted to 6.8-7.0.

In some embodiments, the total amount of total calcium in the demineralised solution is 20-2000 mg/kg dry weight and pH is adjusted to 7.0-7.2.

In some embodiments, the total amount of total calcium in the demineralised solution is 20-2000 mg/kg dry weight and pH is adjusted to 7.2-7.4.

In some embodiments, the total amount of total calcium in the demineralised solution is 20-2000 mg/kg dry weight and pH is adjusted to 7.4-7.6.

In some embodiments, the total amount of total calcium in the demineralised solution is 20-2000 mg/kg dry weight and pH is adjusted to 7.6-7.8.

In some embodiments, the total amount of total calcium in the demineralised solution is 20-2000 mg/kg dry weight and pH is adjusted to 7.8-8.0.

In some embodiments, the total amount of total calcium in the demineralised solution is 20-2000 mg/kg dry weight and pH is adjusted to 8.0-8.5.

In some embodiments, the total amount of total calcium in the demineralised solution is 20-2000 mg/kg dry weight and pH is adjusted to 8.5-9.0.

In some embodiments, the total amount of total calcium in the demineralised solution is 20-500 mg/kg dry weight and pH is adjusted to 6.0-6.2.

In some embodiments, the total amount of total calcium in the demineralised solution is 20-500 mg/kg dry weight and pH is adjusted to 6.2-6.4.

In some embodiments, the total amount of total calcium in the demineralised solution is 20-500 mg/kg dry weight and pH is adjusted to 6.4-6.6.

In some embodiments, the total amount of total calcium in the demineralised solution is 20-500 mg/kg dry weight and pH is adjusted to 6.6-6.8.

In some embodiments, the total amount of total calcium in the demineralised solution is 20-500 mg/kg dry weight and pH is adjusted to 6.8-7.0.

In some embodiments, the total amount of total calcium in the demineralised solution is 20-500 mg/kg dry weight and pH is adjusted to 7.0-7.2.

In some embodiments, the total amount of total calcium in the demineralised solution is 20-500 mg/kg dry weight and pH is adjusted to 7.2-7.4.

In some embodiments, the total amount of total calcium in the demineralised solution is 20-500 mg/kg dry weight and pH is adjusted to 7.4-7.6.

In some embodiments, the total amount of total calcium in the demineralised solution is 20-500 mg/kg dry weight and pH is adjusted to 7.6-7.8.

In some embodiments, the total amount of total calcium in the demineralised solution is 20-500 mg/kg dry weight and pH is adjusted to 7.8-8.0.

In some embodiments, the total amount of total calcium in the demineralised solution is 50-250 mg/kg dry weight and pH is adjusted to 6.0-6.2.

In some embodiments, the total amount of total calcium in the demineralised solution is 50-250 mg/kg dry weight and pH is adjusted to 6.2-6.4.

In some embodiments, the total amount of total calcium in the demineralised solution is 50-250 mg/kg dry weight and pH is adjusted to 6.4-6.6.

In some embodiments, the total amount of total calcium in the demineralised solution is 50-250 mg/kg dry weight and pH is adjusted to 6.6-6.8.

In some embodiments, the total amount of total calcium in the demineralised solution is 50-250 mg/kg dry weight and pH is adjusted to 6.8-7.0.

In some embodiments, the total amount of total calcium in the demineralised solution is 50-250 mg/kg dry weight and pH is adjusted to 7.0-7.2.

In some embodiments, the total amount of total calcium in the demineralised solution is 50-250 mg/kg dry weight and pH is adjusted to 7.2-7.4.

In some embodiments, the total amount of total calcium in the demineralised solution is 50-250 mg/kg dry weight and pH is adjusted to 7.4-7.6.

In some embodiments, the total amount of total calcium in the demineralised solution is 50-250 mg/kg dry weight and pH is adjusted to 7.6-7.8.

In some embodiments, the total amount of total calcium in the demineralised solution is 50-250 mg/kg dry weight and pH is adjusted to 7.8-8.0.

In some embodiments, the total amount of total calcium in the demineralised solution is 50-250 mg/kg dry weight and pH is adjusted to 8.0-8.5.

In some embodiments, the total amount of total calcium in the demineralised solution is 50-250 mg/kg dry weight and pH is adjusted to 8.5-9.0.

In some embodiments, the total amount of total calcium in the demineralised solution is 50-150 mg/kg dry weight and pH is adjusted to 6.0-6.2.

In some embodiments, the total amount of total calcium in the demineralised solution is 50-150 mg/kg dry weight and pH is adjusted to 6.2-6.4.

In some embodiments, the total amount of total calcium in the demineralised solution is 50-150 mg/kg dry weight and pH is adjusted to 6.4-6.6.

In some embodiments, the total amount of total calcium in the demineralised solution is 50-150 mg/kg dry weight and pH is adjusted to 6.6-6.8.

In some embodiments, the total amount of total calcium in the demineralised solution is 50-150 mg/kg dry weight and pH is adjusted to 6.8-7.0.

In some embodiments, the total amount of total calcium in the demineralised solution is 50-150 mg/kg dry weight and pH is adjusted to 7.0-7.2.

In some embodiments, the total amount of total calcium in the demineralised solution is 50-150 mg/kg dry weight and pH is adjusted to 7.2-7.4.

In some embodiments, the total amount of total calcium in the demineralised solution is 50-150 mg/kg dry weight and pH is adjusted to 7.4-7.6.

In some embodiments, the total amount of total calcium in the demineralised solution is 50-150 mg/kg dry weight and pH is adjusted to 7.6-7.8.

In some embodiments, the total amount of total calcium in the demineralised solution is 50-150 mg/kg dry weight and pH is adjusted to 7.8-8.0.

In some embodiments, the total amount of total calcium in the demineralised solution is 10-40 mg/kg dry weight and pH is adjusted to 6.0-6.2.

In some embodiments, the total amount of total calcium in the demineralised solution is 10-40 mg/kg dry weight and pH is adjusted to 6.2-6.4.

In some embodiments, the total amount of total calcium in the demineralised solution is 10-40 mg/kg dry weight and pH is adjusted to 6.4-6.6.

In some embodiments, the total amount of total calcium in the demineralised solution is 10-40 mg/kg dry weight and pH is adjusted to 6.6-6.8.

In some embodiments, the total amount of total calcium in the demineralised solution is 10-40 mg/kg dry weight and pH is adjusted to 6.8-7.0.

In some embodiments, the total amount of total calcium in the demineralised solution is 10-40 mg/kg dry weight and pH is adjusted to 7.0-7.2.

In some embodiments, the total amount of total calcium in the demineralised solution is 10-40 mg/kg dry weight and pH is adjusted to 7.2-7.4.

In some embodiments, the total amount of total calcium in the demineralised solution is 10-40 mg/kg dry weight and pH is adjusted to 7.4-7.6.

In some embodiments, the total amount of total calcium in the demineralised solution is 10-40 mg/kg dry weight and pH is adjusted to 7.6-7.8.

In some embodiments, the total amount of total calcium in the demineralised solution is 10-40 mg/kg dry weight and pH is adjusted to 7.8-8.0.

In some embodiments, the total amount of total calcium in the demineralised solution is 10-40 mg/kg dry weight and pH is adjusted to 8.0-8.5.

In some embodiments, the total amount of total calcium in the demineralised solution is 10-40 mg/kg dry weight and pH is adjusted to 8.5-9.0.

In some embodiments, the total amount of total calcium in the demineralised solution is 20-30 mg/kg dry weight and pH is adjusted to 6.0-6.2.

In some embodiments, the total amount of total calcium in the demineralised solution is 20-30 mg/kg dry weight and pH is adjusted to 6.2-6.4.

In some embodiments, the total amount of total calcium in the demineralised solution is 20-30 mg/kg dry weight and pH is adjusted to 6.4-6.6.

In some embodiments, the total amount of total calcium in the demineralised solution is 20-30 mg/kg dry weight and pH is adjusted to 6.6-6.8.

In some embodiments, the total amount of total calcium in the demineralised solution is 20-30 mg/kg dry weight and pH is adjusted to 6.8-7.0.

In some embodiments, the total amount of total calcium in the demineralised solution is 20-30 mg/kg dry weight and pH is adjusted to 7.0-7.2.

In some embodiments, the total amount of total calcium in the demineralised solution is 20-30 mg/kg dry weight and pH is adjusted to 7.2-7.4.

In some embodiments, the total amount of total calcium in the demineralised solution is 20-30 mg/kg dry weight and pH is adjusted to 7.4-7.6.

In some embodiments, the total amount of total calcium in the demineralised solution is 20-30 mg/kg dry weight and pH is adjusted to 7.6-7.8.

In some embodiments, the total amount of total calcium in the demineralised solution is 20-30 mg/kg dry weight and pH is adjusted to 7.8-8.0.

In some embodiments, the total amount of total calcium in the demineralised solution is 20-30 mg/kg dry weight and pH is adjusted to 8.0-8.5.

In some embodiments, the total amount of total calcium in the demineralised solution is 20-30 mg/kg dry weight and pH is adjusted to 8.5-9.0.

In step b), a suspension comprising acid-gellable whey protein aggregates is obtained by heat-treating the demineralised whey protein solution to a temperature of at least 68 degrees C. for at most 2 hours.

In some embodiments, the demineralised whey protein solution is heated to a temperature of at least 68 degrees, such as at least 70 degrees, such as at least 72 degrees, such as at least 74 degrees, such as at least 76 degrees, such as at least 78 degrees, such as at least 80 degrees, such as at least 82 degrees, such as at least 84 degrees, such as at least 86 degrees, such as at least 88 degrees, such as at least 90 degrees C.

In some embodiments, the demineralised whey protein solution is heated to a temperature in the range of 68-110 degrees C., preferably 70-105 degrees C., such as 72-100 degrees C., such as 75-95 degrees C.

In some embodiments, the demineralised whey protein solution is heated for a period of at most 2 hours, such as at most 1.5 hours, such as at most 1 hour, such as at most 50 minutes, such as at most 40 minutes, such as at most 35 minutes, such as at most 30 minutes, such as at most 25 minutes, such as at most 20 minutes, such as at most 15 minutes, such as at most 10 minutes, such as at most 5 minutes.

In some embodiments, the demineralised whey protein solution is heated for a period of 5-60 minutes, such as 5-50 minutes, such as 5-40 minutes, such as 5-30 minutes, such as 5-20 minutes, such as 5-10 minutes. In other embodiments the demineralised whey protein solution is heated for a period of 10-60 minutes, such as 10-50 minutes, such as 10-40 minutes, such as 10-30 minutes, such as 10-20 minutes.

The concentration of acid-gellable whey protein aggregates in the suspension obtained from of step b) is in some preferred embodiments at least 0.5% (w/w), preferably at least 1.0% (w/w), more preferably at least 2% (w/w), and even more preferably at least 4% (w/w), such as for example at least 6% (w/w).

In some preferred embodiments, the concentration of acid-gellable whey protein aggregates of the suspension obtained from of step b) is in the range of 0.5-10% (w/w), preferably in the range of 1.0-9% (w/w), more preferably in the range of 2-8% (w/w), and even more preferably in the range of 3-7% (w/w).

In other preferably embodiments the concentration of acid-gellable whey protein aggregates of the suspension obtained from of step b) is in the range of 1-10% (w/w), preferably in the range of 1-8% (w/w), more preferably in the range of 1-6% (w/w), and even more preferably in the range of 2-6% (w/w), such as preferably in the range of 2-4% (w/w).

In some preferred embodiments of the invention, the suspension obtained from step b) comprises at least 10% (w/w) acid-gellable whey protein aggregates relative to the total amount of protein, preferably at least 20% (w/w) acid-gellable whey protein aggregates, more preferably at least 30% (w/w) acid-gellable whey protein aggregates, and even more preferably at least 40% (w/w) acid-gellable whey protein aggregates relative to the total amount of protein.

Even higher concentrations of acid-gellable whey protein aggregates may be preferred, thus the suspension obtained from step b) preferably comprises at least 50% (w/w) acid-gellable whey protein aggregates relative to the total amount of protein, preferably at least 60% (w/w) acid-gellable whey protein aggregates, more preferably at least 70% (w/w) acid-gellable whey protein aggregates, and even more preferably at least 90% (w/w) acid-gellable whey protein aggregates relative to the total amount of protein.

In some preferred embodiments of the invention, the suspension obtained from step b) comprises in the range of 10-100% (w/w) acid-gellable whey protein aggregates relative to the total amount of protein, preferably in the range of 20-90% (w/w) acid-gellable whey protein aggregates, more preferably in the range of 30-80% (w/w) acid-gellable whey protein aggregates, and even more preferably in the range of 40-70% (w/w) acid-gellable whey protein aggregates relative to the total amount of protein.

In step c) the heat-treated suspension is cooled to a temperature of at most 30 degrees C. in order to stop the denaturation process.

In some embodiments, the heat-treated suspension is cooled to a temperature of at most 25 degrees C. Preferably, the heat-treated suspension is cooled to a temperature of at most 20 degrees C., such as at most 15 degrees C. Even more preferably, the heat-treated suspension is cooled to a temperature of at most 10 degrees C., such as at most 5 degrees C.

In some embodiments, the heat-treated suspension is cooled to a temperature of 0-30 degrees C., preferably 0-20 degrees C., an even more preferably 0-10 degrees C. In other embodiments the heat-treated suspension is cooled to a temperature of 5-30 degrees C., such as 5-25 degrees C., such as 5-20 degrees C., such as 5-15 degrees C., such as 5-10 degrees C.

The concentration of acid-gellable whey protein aggregates in the cooled suspension obtained from of step c) is in some preferred embodiments at least 0.5% (w/w), preferably at least 1.0% (w/w), more preferably at least 2% (w/w), and even more preferably at least 4% (w/w), such as for example at least 6% (w/w).

In some preferred embodiments, the concentration of acid-gellable whey protein aggregates of the cooled suspension obtained from of step c) is in the range of 0.5-10% (w/w), preferably in the range of 1.0-9% (w/w), more preferably in the range of 2-8% (w/w), and even more preferably in the range of 3-7% (w/w).

In other preferably embodiments the concentration of acid-gellable whey protein aggregates of the cooled suspension obtained from of step c) is in the range of 1-10% (w/w), preferably in the range of 1-8% (w/w), more preferably in the range of 1-6% (w/w), and even more preferably in the range of 2-6% (w/w), such as preferably in the range of 2-4% (w/w).

In some preferred embodiments of the invention, the cooled suspension obtained from step c) comprises at least 10% (w/w) acid-gellable whey protein aggregates relative to the total amount of protein, preferably at least 20% (w/w) acid-gellable whey protein aggregates, more preferably at least 30% (w/w) acid-gellable whey protein aggregates, and even more preferably at least 40% (w/w) acid-gellable whey protein aggregates relative to the total amount of protein.

Even higher concentrations of acid-gellable whey protein aggregates may be preferred, thus the cooled suspension obtained from step c) preferably comprises at least 50% (w/w) acid-gellable whey protein aggregates relative to the total amount of protein, preferably at least 60% (w/w) acid-gellable whey protein aggregates, more preferably at least 70% (w/w) acid-gellable whey protein aggregates, and even more preferably at least 90% (w/w) acid-gellable whey protein aggregates relative to the total amount of protein.

In some preferred embodiments of the invention, the cooled suspension obtained from step c) comprises in the range of 10-100% (w/w) acid-gellable whey protein aggregates relative to the total amount of protein, preferably in the range of 20-90% (w/w) acid-gellable whey protein aggregates, more preferably in the range of 30-80% (w/w) acid-gellable whey protein aggregates, and even more preferably in the range of 40-70% (w/w) acid-gellable whey protein aggregates relative to the total amount of protein.

In step d) the cooled suspension is concentrated until a concentration of at least 4% (w/w) acid-gellable whey protein aggregates is obtained. The suspension obtained from step d) is referred to as the concentrated suspension.

If the cooled suspension of step c) already contains at least 4% (w/w) acid-gellable whey protein aggregates then step d) increases the concentration of the acid-gellable whey protein aggregates by at least 10% relative to the concentration of acid-gellable whey protein aggregates in the cooled suspension of step c). Preferably, step d) increases the concentration of the acid-gellable whey protein aggregates by at least 20% relative to the concentration of acid-gellable whey protein aggregates in the cooled suspension of step c), more preferably at least 30%, and even more preferably at least 50%. It may for example be preferred that step d) increases the concentration of the acid-gellable whey protein aggregates by at least 80% relative to the concentration of acid-gellable whey protein aggregates in the cooled suspension of step c), preferably at least 100%, more preferably at least 150%, and even more preferably at least 200%.

The concentration procedure can be any concentration procedure known within the art. Hence, In some embodiments, the cooled suspension is concentrated by subjecting the cooled suspension to filtration and/or evaporation. For example, filtration techniques such as ultrafiltration, nanofiltration or reverse osmosis may be employed for concentration.

The concentration of acid-gellable whey protein aggregates in the concentrated suspension is in some preferred embodiments at least 6% (w/w), preferably at least 7% (w/w), more preferably at least 8% (w/w), and even more preferably at least 9% (w/w), such as for example at least 10% (w/w).

In some embodiments, the concentration of acid-gellable whey protein aggregates in the concentrated suspension is in the range of 4-15% (w/w), preferably in the range of 6-12% (w/w), more preferably in the range of 7-11% (w/w), and even more preferably in the range of 8-10% (w/w).

In other preferably embodiments the concentration of acid-gellable whey protein aggregates in the concentrated suspension is in the range of 4-14% (w/w), preferably in the range of 6-14% (w/w), more preferably in the range of 8-14% (w/w), and even more preferably in the range of 10-14% (w/w), such as for example in the range of 12-14% (w/w).

In yet other preferred embodiments the concentration of acid-gellable whey protein aggregates in the concentrated suspension is in the range of 6-15% (w/w), preferably in the range of 6-13% (w/w), more preferably in the range of 6-12% (w/w), even more preferably in the range of 6-11% (w/w), and most preferably in the range of 6-10% (w/w).

During the concentration of the suspension in step d) pH may change because of the removal of ions. Hence, an adjustment of pH of the concentrated suspension may be necessary. In some embodiments, pH of the concentrated suspension is adjusted to 6-9, such as for example 6.0-8.0, such as for example 6.0-7.5, such as for example 6.5-7.5.

In some embodiments, pH of the concentrated suspension is adjusted to 6.0-9, such as for example 6.0-8.0, such as for example 6.0-7.8, such as for example 6.0-7.6, such as for example 6.0-7.4, such as for example 6.0-7.2, such as for example 6.0-7.0, such as for example 6.0-6.8, such as for example 6.0-6.6, such as for example 6.0-6.4, such as for example 6.0-6.2.

In some other embodiments, pH of the concentrated suspension is adjusted to 6.2-9.0, such as for example 6.4-9.0, such as for example 6.6-9.0, such as for example 6.8-9.0, such as for example 7.0-9.0, such as for example 7.2-9.0, such as for example 7.4-9.0, such as for example 7.6-9.0, such as for example 7.8-9.0.

In additional embodiments, pH of the concentrated suspension is adjusted to 6.0-8.0, such as for example 6.4-8.0, such as for example 6.6-8.0, such as for example 6.8-8.0, such as for example 7.0-8.0, such as for example 7.2-8.0, such as for example 7.4-8.0, such as for example 7.6-8.0, such as for example 7.8-8.0.

The suspension comprising the acid-gellable whey protein aggregates is mixed with native whey protein. The mixing is performed either by mixing the cooled suspension obtained in step c) and/or the concentrated suspension obtained in step d) with native whey protein so that a composition having a weight ratio of native whey protein to acid-gellable whey protein aggregates ranging from 0.05:1 to 4:1 is obtained.

In one embodiment, the cooled suspension of step c) is mixed with native whey protein before concentrating the suspension in step d).

In another embodiment, the concentrated suspension of step d) is mixed with native whey protein before drying the concentrated suspension in step e).

In some embodiments, native whey protein is added to the suspension obtained from step c) and/or the concentrated suspension obtained from step d). The native whey protein is preferably added in an amount sufficient to obtain a weight ratio of native whey protein to acid-gellable whey protein aggregates ranging from 0.05:1 to 4:1, such as for example from 0.05:1 to 3:1, such as for example from 0.05:1 to 2:1, such as for example from 0.05:1 to 1:1. In other embodiments the weight ratio of native whey protein to acid-gellable whey protein aggregates in the suspension obtained by the method of claim 1 is ranging from 0.25:1 to 4:1, such as for example from 0.50:1 to 4:1, such as for example from 0.75:1 to 4:1, such as for example from 1:1 to 4:1.

In some preferred embodiments of the invention, the concentrated suspension obtained from step d) comprises at least 10% (w/w) acid-gellable whey protein aggregates relative to the total amount of protein, preferably at least 20% (w/w) acid-gellable whey protein aggregates, more preferably at least 30% (w/w) acid-gellable whey protein aggregates, and even more preferably at least 40% (w/w) acid-gellable whey protein aggregates relative to the total amount of protein.

Even higher concentrations of acid-gellable whey protein aggregates may be preferred, thus the concentrated suspension obtained from step d) preferably comprises at least 50% (w/w) acid-gellable whey protein aggregates relative to the total amount of protein, preferably at least 60% (w/w) acid-gellable whey protein aggregates, more preferably at least 70% (w/w) acid-gellable whey protein aggregates, and even more preferably at least 90% (w/w) acid-gellable whey protein aggregates relative to the total amount of protein.

In some preferred embodiments of the invention, the concentrated suspension obtained from step d) comprises in the range of 10-100% (w/w) acid-gellable whey protein aggregates relative to the total amount of protein, preferably in the range of 20-90% (w/w) acid-gellable whey protein aggregates, more preferably in the range of 30-80% (w/w) acid-gellable whey protein aggregates, and even more preferably in the range of 40-70% (w/w) acid-gellable whey protein aggregates relative to the total amount of protein.

In some preferred embodiments, the method comprises step e) of drying the concentrated suspension obtained in step d). The suspension can be dried by use of any drying process known within the technical area. Examples of drying processes include spray-drying, freeze-drying, continuous vacuum-drying and drum-drying.

The temperature of the concentrated suspension of step d) is preferably maintained at at most 30 degrees C. until the concentrated suspension is either subjected to the drying of step e) or another use. For example, the temperature of the concentrated suspension of step d) is preferably maintained at at most 30 degrees C. until the concentrated suspension is subjected to the drying of step e). Alternatively, the temperature of the concentrated suspension of step d) is preferably maintained at at most 30 degrees C. until the concentrated suspension is used for another purpose than drying.

The drying of step e) is deemed to commence as soon as the suspension to be dried enters the drying equipment, including pre-heaters and any other equipment used in step e).

Step e) preferably involves spray-drying the concentrated suspension.

The temperature of the concentrated suspension of step d) is preferably maintained at at most 30 degrees C., preferably at most 25 degrees C., and even more preferably at most 15 degrees C. In some preferred embodiments of the invention, the temperature of the concentrated suspension of step d) is maintained at a temperature in the range of 0-30 degrees C., preferably at a temperature in the range of 4-25 degrees C., and even more preferably at a temperature in the range of 4-15 degrees C.

Alternatively, the temperature of the concentrated suspension of step d) may be maintained at a temperature in the range of 0-20 degrees C., an even more preferably in the range of 0-15 degrees C.

The lower temperature limit is in principle determined by the temperature at which freezing of the cooled suspension commences.

As said, the duration between the concentration of step d) and the drying of step e) or other use of the concentrated suspension is at most 48 hours.

In preferred embodiments of the invention, the duration between the concentration of step d) and the drying of step e) or other use of the concentrated suspension is at most 36 hours. Preferably, the duration between the concentration of step d) and the drying of step e) or other use of the concentrated suspension is at most 30 hours. Even more preferably, the duration between the concentration of step d) and the drying of step e) or other use of the concentrated suspension is at most 25 hours.

For example, the duration between the concentration of step d) and the drying of step e) or other use of the concentrated suspension may be at most 20 hours. Preferably, the duration between the concentration of step d) and the drying of step e) or other use of the concentrated suspension is at most 15 hours. Even more preferably, the duration between the concentration of step d) and the drying of step e) or other use of the concentrated suspension is at most 10 hours. Even more preferably, the duration between the concentration of step d) and the drying of step e) or other use of the concentrated suspension is at most 5 hours.

In some preferred embodiments of the invention, the concentrated suspension of step d) comprises at least 4% (w/w) acid-gellable whey protein aggregates and the duration between the concentration of step d) and the drying of step e) or other use of the concentrated suspension is at most 48 hours, preferably at most 36 hours and even more preferred at most 25 hours.

For example, the concentrated suspension of step d) may comprise 4-6.0% (w/w) acid-gellable whey protein aggregates and the duration between the concentration of step d) and the drying of step e) or other use of the concentrated suspension may be at most 48 hours, preferably at most 36 hours and even more preferred at most 25 hours.

In some preferred embodiments of the invention, the concentrated suspension of step d) comprises at least 6% (w/w) acid-gellable whey protein aggregates and the duration between the concentration of step d) and the drying of step e) or other use of the concentrated suspension is at most 36 hours, preferably at most 25 hours and even more preferred at most 15 hours.

For example, the concentrated suspension of step d) may comprise 6.0-7.0% (w/w) acid-gellable whey protein aggregates and the duration between the concentration of step d) and the drying of step e) or other use of the concentrated suspension may be at most 36 hours, preferably at most 25 hours and even more preferred at most 15 hours.

In some preferred embodiments of the invention, the concentrated suspension of step d) comprises at least 7% (w/w) acid-gellable whey protein aggregates and the duration between the concentration of step d) and the drying of step e) or other use of the concentrated suspension is at most 15 hours, preferably at most 10 hours and even more preferred at most 5 hours.

For example, the concentrated suspension of step d) may comprise 7.0-8.0% (w/w) acid-gellable whey protein aggregates and the duration between the concentration of step d) and the drying of step e) or other use of the concentrated suspension may be at most 15 hours, preferably at most 10 hours and even more preferred at most 5 hours.

In some preferred embodiments of the invention, the concentrated suspension of step d) comprises at least 8% (w/w) acid-gellable whey protein aggregates and the duration between the concentration of step d) and the drying of step e) or other use of the concentrated suspension is at most 5 hours, preferably at most 2 hours and even more preferred at most 1 hour.

For example, the concentrated suspension of step d) may comprise 8.0-12% (w/w) acid-gellable whey protein aggregates and the duration between the concentration of step d) and the drying of step e) or other use of the concentrated suspension may be at most 5 hours, preferably at most 2 hours and even more preferred at most 1 hour.

In some preferred embodiments of the invention, the method contains step e) in which the concentrated suspension is converted to a powder by drying.

In some preferred embodiments of the invention, the concentrated suspension of step d) is sent directly to step e) without any intermediate storage. In such cases the duration between the concentration of step d) and the drying of step e) is at most 1 hour, preferably at most 0.5 hour and even more preferably at most 0.2 hour. For example, the duration between the concentration of step d) and the drying of step e) may be at most 0.1 hour.

It is particularly preferred that the concentrated suspension is sent directly to step e) when the concentrated suspension comprises at least 8% (w/w).

In other preferred embodiments of the invention, the concentrated suspension obtained from step d) is stored in a storage tank or similar equipment prior to the drying or other use. In such cases, the duration between the concentration of step d) and the drying of step e) is at least 0.1 h, preferably for at least 0.5 h, and even more preferably for at least 1 h. Even longer storage may be employed, thus, the duration between the concentration of step d) and the drying of step e) at least 2 h, preferably for at least 10 h, and even more preferably for at least 15 h.

When the concentrated suspension is stored prior to the drying of step e) or other uses it is sometimes useful to stir or agitate the suspension, which may prevent or at least reduce the risk that the whey protein aggregates agglomerate into larger particles. If employed, the stirring or agitation is preferably performed without creating air bubbles in the suspension.

Instead of drying the concentrated suspension, it may be applied for other uses such as used as an ingredient in the production of a food product. In this case the acid-gellable whey protein composition is a liquid that provides both acid-gellable whey protein aggregates and water to the process in which it is used.

Another aspect of the invention pertains to a method of preparing a food product said method comprising the steps of:
a) providing a demineralised solution comprising 1-15% (w/w) native, denaturable whey protein and having a pH in the range of 6-9,
b) heat-treating the demineralised solution of step a) to a temperature of at least 68 degrees C. for at most 2 hours, thereby obtaining a suspension comprising acid-gellable whey protein aggregates,
c) cooling the suspension of step b) to a temperature of at most 30 degrees C.,
d) concentrating the suspension obtained in step c) to a concentration of acid-gellable whey protein aggregates of at least 4% (w/w), and
subsequently using the concentrated suspension of acid-gellable whey protein aggregates of step d) as an ingredient in the production of the food product,
wherein:
the temperature of the concentrated suspension of step d) is maintained at at most 30 degrees C. until the subsequent use of the concentrated suspension, and
the duration between the concentration of step d) and the subsequent use of the concentrated suspension is at most 48 hours.

Steps a)-d) of the method of producing the food product are the same as the steps a)-d) of the method of preparing the acid-gellable whey protein composition and features mentioned in the context of steps a)-d) of one of the methods equally apply to the other method.

In some preferred embodiments of the invention the duration between the concentration of step d) and the subsequent use is at most 36 hours.

In some preferred embodiments of the invention the demineralised solution comprises 3-15% (w/w) native, denaturable whey protein.

In some preferred embodiments of the invention the demineralised solution has a pH in the range of 6-8.

In some preferred embodiments of the invention the suspension is concentrated until a concentration of acid-gellable whey protein aggregates of at least 6% (w/w) is obtained.

In some preferred embodiments of the invention the concentrated suspension obtained in step d) is produced by subjecting the suspension to ultrafiltration, nanofiltration and/or reverse osmosis.

In some preferred embodiments of the invention the cooled suspension of step c) is mixed with native whey protein before concentrating the suspension in step d) or the concentrated suspension of step d) is mixed with native whey protein before subsequent use of the concentrated suspension.

In some preferred embodiments of the invention the total amount of combined calcium and magnesium in the demineralised solution of step a) is at most 120 mmol/kg dry weight.

In some preferred embodiments of the invention the temperature of the concentrated suspension of step d) is maintained at at most 20 degrees C. until the concentrated suspension is used.

In some preferred embodiments of the invention the concentrated suspension of step d) is immediately after the end of step d) without any intermediate storage.

In some preferred embodiments of the invention the duration between the concentration of step d) and the subsequent use is at most 1 hour.

In some preferred embodiments of the invention the duration between the concentration of step d) and the subsequent use is at most 0.5 hour.

As said, the duration between the concentration of step d) and the subsequent use of the concentrated suspension is at most 48 hours. This means that the storage time of the concentrated suspension from it has been produced by step d) and until it is used in the production of a food product is at most 48 hours.

In preferred embodiments of the invention, the duration between the concentration of step d) and the subsequent use of the concentrated suspension is at most 36 hours. Preferably, the duration between the concentration of step d) and the subsequent use of the concentrated suspension is at most 30 hours. Even more preferably, the duration between the concentration of step d) and the subsequent use of the concentrated suspension is at most 25 hours.

For example, the duration between the concentration of step d) and the subsequent use of the concentrated suspension may be at most 20 hours. Preferably, the duration between the concentration of step d) and the subsequent use of the concentrated suspension is at most 15 hours. Even more preferably, the duration between the concentration of step d) and the subsequent use of the concentrated suspension is at most 10 hours. Even more preferably, the duration between the concentration of step d) and the subsequent use of the concentrated suspension is at most 5 hours.

In some preferred embodiments of the invention, the concentrated suspension of step d) comprises at least 4% (w/w) acid-gellable whey protein aggregates and the duration between the concentration of step d) and the subsequent use of the concentrated suspension is at most 48 hours, preferably at most 36 hours and even more preferred at most 25 hours.

Preferably, the concentrated suspension of step d) may comprise 4-6.0% (w/w) acid-gellable whey protein aggregates and the duration between the concentration of step d) and the subsequent use of the concentrated suspension may be at most 48 hours, preferably at most 36 hours and even more preferred at most 25 hours.

In some preferred embodiments of the invention, the concentrated suspension of step d) comprises at least 6% (w/w) acid-gellable whey protein aggregates and the duration between the concentration of step d) and the subsequent use of the concentrated suspension is at most 36 hours, preferably at most 25 hours and even more preferred at most 15 hours.

For example, the concentrated suspension of step d) may comprise 6.0-7.0% (w/w) acid-gellable whey protein aggregates and the duration between the concentration of step d) and the subsequent use of the concentrated suspension may be at most 36 hours, preferably at most 25 hours and even more preferred at most 15 hours.

In some preferred embodiments of the invention, the concentrated suspension of step d) comprises at least 7% (w/w) acid-gellable whey protein aggregates and the duration between the concentration of step d) and the subsequent use of the concentrated suspension is at most 15 hours, preferably at most 10 hours and even more preferred at most 5 hours.

For example, the concentrated suspension of step d) may comprise 7.0-8.0% (w/w) acid-gellable whey protein aggregates and the duration between the concentration of step d) and the subsequent use of the concentrated suspension may be at most 15 hours, preferably at most 10 hours and even more preferred at most 5 hours.

In some preferred embodiments of the invention, the concentrated suspension of step d) comprises at least 8% (w/w) acid-gellable whey protein aggregates and the duration between the concentration of step d) and the subsequent use of the concentrated suspension is at most 5 hours, preferably at most 2 hours and even more preferred at most 1 hour.

For example, the concentrated suspension of step d) may comprise 8.0-12% (w/w) acid-gellable whey protein aggregates and the duration between the concentration of step d) and the subsequent use of the concentrated suspension may be at most 5 hours, preferably at most 2 hours and even more preferred at most 1 hour.

The method typically does not include step e), i.e. the step of drying the concentrated suspension, when the preparation of the food product uses the concentrated suspension as such as an ingredient.

In some preferred embodiments of the invention, the concentrated suspension of step d) is subjected directly to the subsequent use without any intermediate storage. In such cases the duration between the concentration of step d) and the subsequent use is at most 1 hour, preferably at most 0.5 hour and even more preferably at most 0.2 hour. For example, the duration between the concentration of step d) and the subsequent use may be at most 0.1 hour.

It is particularly preferred that the concentrated suspension is sent directly the subsequent use when the concentrated suspension comprises at least 8% (w/w).

In other preferred embodiments of the invention, the concentrated suspension obtained from step d) is stored in a storage tank or similar equipment prior to the drying or other use. In such cases, the duration between the concentration of step d) and the subsequent use is at least 0.1 h, preferably for at least 0.5 h, and even more preferably for at least 1 h. Even longer storage may be preferred, thus, the duration between the concentration of step d) and the subsequent use may preferably be at least 2 h, more preferably for at least 10 h, and even more preferably for at least 15 h.

Another aspect of the present invention relates to an acid-gellable whey protein powder composition, and preferably a composition which is obtainable by the novel method described herein.

In particular, the present invention pertains to an acid-gellable whey protein powder composition having a total amount of protein of at least 60% (w/w) relative to the dry weight of the powder composition and comprising at least 40% (w/w) denatured whey protein particles relative to the total amount of protein, wherein at least 50% (w/w) of the denatured whey protein particles are acid-gellable whey protein aggregates.

In one embodiment, the powder composition is a dry powder composition. In the context of the present invention, the term "dry powder" pertains to a powder containing at most 10% (w/w) water and preferably at most 6% (w/w) water. A method on how to determine the water content in dry powder is disclosed in Example 1.10.

In the context of the present invention, the terms "total protein" and "total amount of protein" are used interchangeably and pertain to the total amount of true protein of a composition or product and disregards non-protein nitrogen (NPN). A method on how to determine the total amount of protein is described in Example 1.4.

In some embodiments, the powder composition has a total amount of protein of at least 60% (w/w) relative to the dry weight of the powder composition, such as for example at least 65% (w/w) relative to the dry weight of the powder composition, such as for example at least 70% (w/w) relative to the dry weight of the powder composition, such as for example at least 75% (w/w) relative to the dry weight of the powder composition, such as for example at least 80% (w/w) relative to the dry weight of the powder composition, such as for example at least 85% (w/w) relative to the dry weight of the powder composition, such as for example at least 90% (w/w) relative to the dry weight of the powder composition.

In some embodiments, the powder composition has a total amount of protein of 60-99% (w/w) relative to the dry weight of the powder composition, such as for example 65-99% (w/w) relative to the dry weight of the powder composition, such as for example 70-99% (w/w) relative to the dry weight of the powder composition, such as for example 75-99% (w/w) relative to the dry weight of the powder composition, such as for example 80-99% (w/w) relative to the dry weight of the powder composition, such as for example 85-99% (w/w) relative to the dry weight of the powder composition, such as for example 90-99% (w/w) relative to the dry weight of the powder composition.

In other embodiments, the powder composition has a total amount of protein of 60-95% (w/w) relative to the dry weight of the powder composition, such as for example 60-90% (w/w) relative to the dry weight of the powder composition, such as for example 60-85% (w/w) relative to the dry weight of the powder composition, such as for example 60-80% (w/w) relative to the dry weight of the powder composition, such as for example 60-75% (w/w) relative to the dry weight of the powder composition, such as for example 60-70% (w/w) relative to the dry weight of the powder composition, such as for example 60-65% (w/w) relative to the dry weight of the powder composition.

In the context of the present invention, the term "denatured whey protein particles" pertains to whey protein molecules that has been irreversibly denatured and have formed aggregates linked together by covalent and/or non-covalent interactions. Such denatured whey protein particles are typically larger than the normal size of the native whey protein.

The degree of denaturation of whey protein can be determined as described in Example 1.3.

In some embodiments, the amount of denatured whey protein particles in the powder composition is at least 40% (w/w) relative to the total amount of protein, such as for example 50-95% (w/w) relative to the total amount of protein, such as for example 60-95% (w/w) relative to the total amount of protein, such as for example 70-95% (w/w) relative to the total amount of protein, such as for example 80-95% (w/w) relative to the total amount of protein, such as for example 85-95% (w/w) relative to the total amount of protein, such as for example 90% (w/w) relative to the total amount of protein.

In some embodiments, the amount of acid-gellable whey protein aggregates in the powder composition is at least 50% (w/w) of the denatured whey protein particles, such as for example at least 60% (w/w) of the denatured whey protein particles, such as for example at least 70% (w/w) of the denatured whey protein particles, such as for example at least 80% (w/w) of the denatured whey protein particles, such as for example at least 90% (w/w) of the denatured whey protein particles. In some embodiments, the amount of acid-gellable whey protein aggregates in the powder composition is 50-100% (w/w) of the denatured whey protein particles, such as for example 60-100% (w/w) of the denatured whey protein particles, such as for example 70-100% (w/w) of the denatured whey protein particles, such as for example 80-100% (w/w) of the denatured whey protein particles.

The acid-gellable whey protein powder composition may also in some embodiments contain native whey protein.

In some embodiments, the amount of native whey protein in the powder composition is at least 10% (w/w) relative to the total amount of protein, such as for example at least 20% (w/w) relative to the total amount of protein, such as for example at least 30% (w/w) relative to the total amount of protein, such as for example at least 40% (w/w) relative to the total amount of protein, such as for example at least 50% (w/w) relative to the total amount of protein, such as for example at least 60% (w/w) relative to the total amount of protein.

The acid-gellable whey protein powder composition may also in some embodiments contain insoluble matter. In the context of the present invention, the term "insoluble matter" refers to the volume of sediments that is left after dissolving and centrifugation of a powder solution and is a measure for a powder's ability to dissolve in water. The content of insoluble matter can be determined as described in Example 1.7.

In some embodiments, the amount of insoluble matter in the powder composition is at most 1% (v/v) relative to the dry weight of the powder composition, such as for example at most 0.5% (v/v) relative to the dry weight of the powder composition, such as for example at most 0.3% (v/v) relative to the dry weight of the powder composition, such as for example at most 0.2% (v/v) relative to the dry weight of the powder composition, such as for example at most 0.1% (v/v) relative to the dry weight of the powder composition.

The acid-gellable whey protein powder composition may be characterised by its bulk density.

In the context of the present invention, the term "bulk density" of a powder pertains to the density, i.e. relation between weight and volume, of a population of powder particles when tapped in a controlled manner 625 times. The bulk density is determined as disclosed in Example 1.6.

In some embodiments, the bulk density of the acid-gellable whey protein powder composition is at least 0.20 g/mL, such as for example at least 0.25 g/mL, such as for example at least 0.30 g/mL, such as for example at least 0.35 g/mL, such as for example at least 0.40 g/mL.

In other embodiments, the bulk density of the acid-gellable whey protein powder composition is 0.10-0.50 g/mL, such as for example 0.20-0.40 g/mL, such as for example 0.25-0.35 g/mL.

In some embodiments, the bulk density of the acid-gellable whey protein powder composition is 0.20-0.50 g/mL, such as for example 0.25-0.50 g/mL, such as for example 0.30-0.50 g/mL, such as for example 0.35-0.50 g/mL, such as for example 0.40-0.50 g/mL. In yet some other embodiments the bulk density of the acid-gellable whey protein powder composition is 0.20-0.45 g/mL, such as for example 0.20-0.40 g/mL, such as for example 0.20-0.35 g/mL, such as for example 0.20-0.30 g/mL, such as for example 0.20-0.25 g/mL.

The acid-gellable whey protein powder composition may be characterised by its acid-gel strength.

In the context of the present invention, the term "acid-gel strength" pertains to the storage modulus of the gel obtained when subjecting a sample of an acid-gellable whey protein powder composition to a standardized acid-gelling procedure. The acid-gel strength is determined using the method disclosed in Example 1.5.

In some embodiments, the acid-gel strength is at least 10 Pa, such as at least 50 Pa, such as at least 100 Pa, such as at least 150 Pa, such as at least 250 Pa, such as at least 500 Pa, such as at least 750 Pa, such as at least 1000 Pa.

In some embodiments, the acid-gel strength is 10-1000 Pa, such as for example 50-1000 Pa, such as for example 100-1000 Pa, such as for example 150-1000 Pa, such as for example 250-1000 Pa, such as for example 500-1000 Pa.

A further aspect of the present invention relates to an acid-gellable whey protein suspension, and preferably a suspension which is obtainable by the novel method described herein.

In a particular further aspect, the present invention pertains to an acid-gellable whey protein suspension having a total amount of protein of at least 5% (w/w) relative to the total amount of suspension and comprising 40-95% (w/w) denatured whey protein particles relative to the total amount of protein, wherein at least 50% (w/w) of the denatured whey protein particles are acid-gellable whey protein aggregates.

In some embodiments, the suspension has a total amount of protein of at least 5% (w/w) relative to the total amount of suspension, such as for example at least 6% (w/w) relative to the total amount of suspension, such as for example at least 8% (w/w) relative to the total amount of suspension, such as for example at least 10% (w/w) relative to the total amount of suspension, such as for example at least 12% (w/w) relative to the total amount of suspension, such as for example at least 15% (w/w) relative to the total amount of suspension.

In some embodiments, the suspension has a total amount of protein of 5-20% (w/w) relative to the total amount of suspension, such as for example 6-20% (w/w) relative to the total amount of suspension, such as for example 8-20% (w/w) relative to the total amount of suspension, such as for example 10-20% (w/w) relative to the total amount of suspension, such as for example 12-20% (w/w) relative to the total amount of suspension, such as for example 15-20% (w/w) relative to the total amount of suspension. In other embodiments the suspension has a total amount of protein of 5-15% (w/w) relative to the total amount of suspension, such as for example 5-12% (w/w) relative to the total amount of suspension, such as for example 5-10% (w/w) relative to the total amount of suspension, such as for example 5-8% (w/w) relative to the total amount of suspension.

In some embodiments, the amount of denatured whey protein particles is 40-95% (w/w) relative to the total amount of protein, such as for example 50-95% (w/w) relative to the total amount of protein, such as for example 60-95% (w/w) relative to the total amount of protein, such as for example 70-95% (w/w) relative to the total amount of protein, such as for example 80-95% (w/w) relative to the total amount of protein, such as for example 85-95% (w/w) relative to the total amount of protein, such as for example 90% (w/w) relative to the total amount of protein.

In some embodiments, the amount of acid-gellable whey protein aggregates is at least 50% (w/w) of the denatured whey protein particles, such as for example at least 60% (w/w) of the denatured whey protein particles, such as for example at least 70% (w/w) of the denatured whey protein particles, such as for example at least 80% (w/w) of the denatured whey protein particles, such as for example at least 90% (w/w) of the denatured whey protein particles.

In some embodiments, the amount of acid-gellable whey protein aggregates is 50-100% (w/w) of the denatured whey protein particles, such as for example 60-100% (w/w) of the denatured whey protein particles, such as for example 70-100% (w/w) of the denatured whey protein particles, such as for example 80-100% (w/w) of the denatured whey protein particles.

The acid-gellable whey protein suspension may also in some embodiments contain native whey protein.

In some embodiments, the amount of native whey protein in the suspension is at least 10% (w/w) relative to the total amount of protein in the acid-gellable whey protein suspension, such as for example at least 20% (w/w) relative to the total amount of protein, such as for example at least 30% (w/w) relative to the total amount of protein, such as for example at least 40% (w/w) relative to the total amount of protein, such as for example at least 50% (w/w) relative to the total amount of protein, such as for example at least 60% (w/w) relative to the total amount of protein.

In one embodiment, the acid-gellable whey protein powder comprises a total amount of protein of at least 70% (w/w) relative to the dry weight of the powder composition, in which the content of denatured whey protein particles is 45-80% (w/w) relative to the total amount of protein, wherein at least 70% (w/w) of the denatured whey protein particles are acid-gellable whey protein aggregates.

The terms "acid-gellable whey protein powder" and "acid-gellable whey protein powder composition" are used interchangeably.

In another embodiment, the acid-gellable whey protein powder comprises a total amount of protein of at least 70% (w/w) relative to the dry weight of the powder composition, in which the content of denatured whey protein particles is 50-90% (w/w) relative to the total amount of protein, wherein at least 80% (w/w) of the denatured whey protein particles are acid-gellable whey protein aggregates.

In a further embodiment, the acid-gellable whey protein powder comprises a total amount of protein of at least 70% (w/w) relative to the dry weight of the powder composition, in which the content of denatured whey protein particles is 50-99% (w/w) relative to the total amount of protein, wherein at least 80% (w/w) of the denatured whey protein particles are acid-gellable whey protein aggregates.

In yet another one embodiment, the acid-gellable whey protein powder comprises a total amount of protein of at least 80% (w/w) relative to the dry weight of the powder composition, in which the content of denatured whey protein particles is 60-90% (w/w) relative to the total amount of protein, wherein at least 90% (w/w) of the denatured whey protein particles are acid-gellable whey protein aggregates.

In yet a further embodiment, the acid-gellable whey protein powder comprises a total amount of protein of at least 80% (w/w) relative to the dry weight of the powder composition, in which the content of denatured whey protein particles is 50-99% (w/w) relative to the total amount of protein, wherein at least 80% (w/w) of the denatured whey protein particles are acid-gellable whey protein aggregates.

In one embodiment, the acid-gellable whey protein suspension comprises a total amount of protein of at least 8% (w/w) relative to the weight of the suspension, in which the content of denatured whey protein particles is 45-80% (w/w) relative to the total amount of protein, wherein at least 70% (w/w) of the denatured whey protein particles are acid-gellable whey protein aggregates.

In another embodiment, the acid-gellable whey protein suspension comprises a total amount of protein of at least 10% (w/w) relative to the weight of the suspension, in which the content of denatured whey protein particles is 50-90% (w/w) relative to the total amount of protein, wherein at least 80% (w/w) of the denatured whey protein particles are acid-gellable whey protein aggregates.

In yet another one embodiment, the acid-gellable whey protein suspension comprises a total amount of protein of at least 12% (w/w) relative to the weight of the suspension, in which the content of denatured whey protein particles is 60-90% (w/w) relative to the total amount of protein, wherein at least 90% (w/w) of the denatured whey protein particles are acid-gellable whey protein aggregates.

In one embodiment, the acid-gellable whey protein suspension comprises a total amount of protein of at least 8% (w/w) relative to the weight of the suspension, in which the content of denatured whey protein particles is 45-99% (w/w) relative to the total amount of protein, wherein at least 70% (w/w) of the denatured whey protein particles are acid-gellable whey protein aggregates.

In another embodiment, the acid-gellable whey protein suspension comprises a total amount of protein of at least 10% (w/w) relative to the weight of the suspension, in which the content of denatured whey protein particles is 50-99% (w/w) relative to the total amount of protein, wherein at least 80% (w/w) of the denatured whey protein particles are acid-gellable whey protein aggregates.

In yet another one embodiment, the acid-gellable whey protein suspension comprises a total amount of protein of at least 12% (w/w) relative to the weight of the suspension, in which the content of denatured whey protein particles is 60-99% (w/w) relative to the total amount of protein, wherein at least 90% (w/w) of the denatured whey protein particles are acid-gellable whey protein aggregates.

In some preferred embodiments of the invention the acid-gellable whey protein suspension and/or the acid-gellable whey protein powder comprises at most 10% (w/w) casein relative to the total amount of protein, preferably at most 8% (w/w) casein, more preferably at most 6% (w/w) casein, and even more preferred at most 4% (w/w) casein relative to the total amount of protein.

Even lower amounts of casein in the acid-gellable whey protein suspension and/or the acid-gellable whey protein powder may be preferred. Thus, the acid-gellable whey protein suspension and/or the acid-gellable whey protein powder may e.g. comprise at most 3% (w/w) casein relative to the total amount of protein, preferably at most 2% (w/w) casein, more preferably at most 1% (w/w) casein, and even more preferred at most 0.2% (w/w) casein relative to the total amount of protein.

In some preferred embodiments of the invention, the acid-gellable whey protein suspension and/or the acid-gellable whey protein powder comprises at least 10% (w/w) acid-gellable whey protein aggregates relative to the total amount of protein, preferably at least 20% (w/w) acid-gellable whey protein aggregates, more preferably at least 30% (w/w) acid-gellable whey protein aggregates, and even more preferably at least 40% (w/w) acid-gellable whey protein aggregates relative to the total amount of protein.

Even higher concentrations of acid-gellable whey protein aggregates may be preferred, thus the acid-gellable whey protein suspension and/or the acid-gellable whey protein powder preferably comprises at least 50% (w/w) acid-gellable whey protein aggregates relative to the total amount of protein, preferably at least 60% (w/w) acid-gellable whey protein aggregates, more preferably at least 70% (w/w) acid-gellable whey protein aggregates, and even more preferably at least 90% (w/w) acid-gellable whey protein aggregates relative to the total amount of protein.

In some preferred embodiments of the invention, the suspension obtained from step b) comprises in the range of 10-100% (w/w) acid-gellable whey protein aggregates relative to the total amount of protein, preferably in the range of 20-90% (w/w) acid-gellable whey protein aggregates, more preferably in the range of 30-80% (w/w) acid-gellable whey protein aggregates, and even more preferably in the range of 40-70% (w/w) acid-gellable whey protein aggregates relative to the total amount of protein.

Yet another aspect of the present invention relates to a food ingredient, which comprises the acid-gellable whey protein powder composition or the acid-gellable whey protein suspension described herein. The food ingredient is preferably a dry powder.

In some embodiments, the food ingredient further comprises one or more components selected from the group consisting of whey protein microparticles, whey protein micelles, micellar casein, caseinate and milk protein.

In the context of the present invention, the term "whey protein microparticles" pertains to insoluble particles of denatured whey protein which have a particle size in the range of 1-10 micron. The insoluble whey protein particles are typically produced by heating a solution of whey protein at an appropriate pH (e.g. pH 5-8) while subjecting the solution to a high degree of internal shear. The shear may be provided by mechanical shearing, using e.g. scraped-surface heat-exchangers or homogenizers or by subjecting the solution to high linear flow rates which promote turbulence.

Examples of useful whey protein micelles may be found in WO 2006/034,857, WO 2007/110,411, WO 2007/110,421 or U.S. Pat. No. 5,882,705A.

In the context of the present invention, the term "micellar casein" pertains to casein present in the casein micelles of milk or in isolates of such casein micelles.

The caseinate preparation may e.g. be a sodium caseinate, potassium caseinate, calcium caseinate, or a combination thereof. Sodium caseinate and/or potassium caseinate is presently preferred.

In the context of the present invention, the term "milk protein" pertains to the protein fraction found in milk and includes both the caseins and the serum proteins. The milk protein may e.g. be provided by liquid milk or a milk powder or by a milk protein concentrate which contains at least 10% (w/w) milk protein relative to the total solids of the concentrate. The milk protein concentrate may either be in liquid or powder form.

In some preferred embodiments of the invention, the food ingredient comprises a total amount of acid-gellable whey protein aggregates of at least 0.1% (w/w) relative to the total amount of protein of the food ingredient, preferably at least 1% (w/w) and even more preferably at least 5% relative to the total amount of protein of the food ingredient.

For example, the food ingredient may e.g. comprise a total amount of acid-gellable whey protein aggregates in the range of 0.1%-60% (w/w) relative to the total amount of protein of the food ingredient, preferably in the range of 1-40% (w/w) and even more preferably in the range of 5-20% relative to the total amount of protein of the food ingredient.

In some embodiments, the food ingredient further comprises carbohydrate, since the acid-gellable whey protein aggregates often are produced from carbohydrate-containing feeds. Additional carbohydrate may be included in the food ingredient to provide extra sweetness or to modify the nutritional content of the ingredient.

The food ingredient may e.g. comprise a total amount of carbohydrate of at most 75% (w/w) relative to the total weight of the food ingredient, for example at most 50% (w/w), e.g. at most 30% (w/w).

In some preferred embodiments of the invention, the food ingredient contains a total amount of carbohydrate of at most 20% (w/w), preferably at most 10% (w/w), and even more preferred at most 5% (w/w).

The carbohydrate normally comprises, or even consists of, lactose, galactose and/or glucose. Galactose and glucose are typically present when the lactose level has been reduced by enzymatic hydrolysis.

The food ingredient may furthermore contain carbohydrate-based stabilisers, such as e.g. locust bean gum, guar gum, alginates, cellulose, xanthan gum, carboxymethyl cellulose, microcrystalline cellulose, carrageenans, pectins, inulin and mixtures thereof. However, in preferred embodiments of the invention it is preferred that the food ingredient contains at most 5% (w/w) carbohydrate-based stabilisers, and preferably most 1% (w/w) carbohydrate-based stabilisers, such as no carbohydrate-based stabilisers.

The food ingredient furthermore typically contains fat, e.g. milk fat or whey fat. For example, the food ingredient may furthermore comprise fat in an amount of at most 8% (w/w) on a dry weight basis. In other embodiments the food ingredient typically contains fat in an amount in the range of 0.1-20% (w/w), such as 0.5-15% (w/w) or 1-10% (w/w). The fat may for example be present in an amount in the range of 0.1-6% (w/w).

In the present context, the term "fat" relates to the total amount of fat in the food product, which can be extracted according to the Rose-Gottlieb principle in which an ammoniacal ethanolic solution of the test sample is extracted with diethyl ether and light petroleum, where after the solvents are removed by distillation or evaporation and finally the mass of extracted substances is determined. Hence, the term "fat" includes, but is not limited to, tri-, di- and monoglycerides, free fatty acids, phospholipids, cholesterols and cholesterol esters.

The food ingredient may e.g. comprise one or more vegetable oil(s) selected from the group consisting of maize oil, sesame oil, soya oil, soya bean oil, linseed oil, grape seed oil, rapeseed oil, olive oil, groundnut oil, sunflower oil, safflower oil and a combination thereof. Alternatively, where the food ingredient may comprise one or more vegetable fat(s), the fat(s) may be selected from the group consisting of palm fat, palm kernel fat and coconut fat and a combination thereof.

Additionally, or alternatively, the food ingredient may comprise one or more animal fats, such as a milk fat. The milk fat may be derived from cream, butter or sweet butter milk solids. It is further normal that the food ingredient contains at least traces of whey fat.

The food ingredient may furthermore comprise one of more vitamin(s) and similar other ingredients such as vitamin A, vitamin D, vitamin E, vitamin K, thiamine, riboflavin, pyridoxine, vitamin B12, niacin, folic acid, pantothenic acid, biotin, vitamin C, choline, inositol, their salts, their derivatives and combinations thereof.

The food ingredient may furthermore contain salts and minerals which typically are present in whey or milk derived products. The mineral content of food ingredients and products are typically represented as the ash content of the food ingredient or product.

Ash is the inorganic residue remaining after the water and organic matter have been removed by heating in the presence of oxidizing agents, and it should be noted that the product to which the ash content relates does not contain the ash particles as such. The ash content is preferably determined by the technique of dry ashing (see Example 1.11.1).

In yet a further aspect, the present invention relates to a food product, which comprises the acid-gellable whey protein powder composition or the acid-gellable whey protein suspension described herein.

In some embodiments, the food product comprises the acid-gellable whey protein powder composition as described herein and in such embodiments the powder may be present in dry, hydrated or gelled form.

If the acid-gellable whey protein powder composition is present in the food product in dry form, the acid-gellable whey protein powder composition has not yet been hydrated or resuspended and is present in the same powder particles as it was produced.

If the acid-gellable whey protein powder composition is present in the food product in hydrated form, the acid-gellable whey protein powder composition has been contacted with water and has at least been hydrated. It is furthermore preferred that the hydrated acid-gellable whey protein powder composition has disintegrated into substantially the same components which were present in the suspension that was converted into the powder.

If the acid-gellable whey protein powder composition is present in the food product in gelled form, the acid-gellable whey protein powder composition has been hydrated and has furthermore been subjected to conditions which make the acid-gellable whey protein particles generate a gel. Such conditions may be acidification and/or contact with salts (e.g. NaCl or KCl).

In some embodiments, the food product may be a dairy product. For example, the food product may be an acidified dairy product such as for example a yoghurt-like product. In these cases gelation is induced during acidification of the acidified product. Examples of yoghurt-like products include a drinking yoghurt-like product, a stirred-type yoghurt-like product and a set-type yoghurt-like product.

In the context of the present invention, the term "yoghurt-like product" pertains to a yoghurt product or a product which has at least the visual appearance and sensory profile similar to that of a yoghurt, be it drinking yoghurt, set-type yoghurt or stirred-type yoghurt. The term yoghurt-like products also covers yoghurt-like products which are casein-free. It should furthermore be noted that the yoghurt-like product may have been produced by bacterial and/or chemical acidification.

In other embodiments of the invention, the food product has the consistency of a set-type yoghurt. Set-type yoghurts are typically characterised in a jelly-like texture and are often allowed to incubate and cool in the final package. Set-type yoghurts are normally non-pourable, but still spoonable, and are often eaten out of the packaging with a spoon.

In yet other embodiments of the invention, the food product has the consistency of a stirred-type yoghurt. Relative to a set-type yoghurt, a stirred-type yoghurt is pourable but often still rather viscous. The term "stirred" is most likely based on the fact that the acidified yoghurt milks originally were stirred to break the formed coagulum/gel and make the product more liquid and pumpable. However, in the context of the present invention, the term "stirred yoghurt" also encompasses yoghurts which have not been subjected to stirring, but which have obtained a liquid-like, viscous texture by other ways.

A food product having a consistency of a stirred-type yoghurt may for example have a viscosity of at most 2500 cP, and typically in the range of 350-2500 cP. For example, the viscosity of the food product may be in the range of 400-2000 cP. The viscosity of the food product may e.g. be in the range of 500-1500 cP. Alternatively, the viscosity of the food product may be in the range of 600-1250 cP. Viscosities of food products are measured as outlined in Example 1.13.

In some embodiments of the invention, the food product has the consistency of a drinking yoghurt and it may even be a drinking yoghurt. A drinking yoghurt or a drinking yoghurt-like product typically have a relatively low viscosity and is easily drinkable. A drinking yoghurt or a drinking yoghurt-like product may for example have a viscosity of at most 400 cP, and typically in the range of 4-400 cP. For example, the viscosity of the drinking yoghurt may be in the range of 10-300 cP. The viscosity of the drinking yoghurt may e.g. be in the range of 15-200 cP. Alternatively, the viscosity of the drinking yoghurt may be in the range of 20-150 cP or in the range of 100-400 cP, such as for example 200-300 cP.

In other embodiments, the food product may be a non-acidified food product, such as e.g. a non-acidified dairy product. Useful examples of non-acidified food products include e.g. casein or milk-containing beverages and milk-containing gelly-type products.

In these cases the gelation may be so-called cold gelation induced by addition of salt such as NaCl, KCl or calcium salts such as e.g. $CaCl_2$. Alternatively, significant amounts of salt may be inherently present in one or more of the other ingredients of the food product.

In some embodiments, the food product further comprises carbohydrate in addition to the acid-gellable whey protein powder and/or acid-gellable whey protein suspension.

Hence, in some embodiments of the invention, the food product comprises one or more sweeteners, such as carbohydrate sweeteners, polyols and/or high intensity sweeteners.

The food product may e.g. comprise a total amount of carbohydrate sweetener in the range of 1-20% (w/w) relative to the total weight of the food product. Alternatively, the food product may comprise a total amount of carbohydrate sweetener in the range of 4-15% (w/w) relative to the total weight of the food product. Since other ingredients of the food product inherently may comprise some carbohydrate sweetener, such as lactose, it will often be sufficient to add carbohydrate sweetener in an amount of about 2-10% relative to the total weight of the food product to reach the desired sweetness of taste. Alternatively, the food product may comprise a total amount of added carbohydrate sweetener in the range of 4-8% (w/w) relative to the total weight of the food product.

In other embodiments, the amount of carbohydrate in the food product is at most 1% (w/w) relative to the total weight of food product, such as for example at most 0.9% (w/w) relative to the total weight of food product, such as for example at most 0.8% (w/w) relative to the total weight of food product, such as for example at most 0.7% (w/w) relative to the total weight of food product, such as for example at most 0.6% (w/w) relative to the total weight of food product, such as for example at most 0.5% (w/w) relative to the total weight of food product. In other embodiments the amount of carbohydrate in the food product is 0.1-1% (w/w) relative to the total weight of food product, such as for example 0.3-1% (w/w) relative to the total weight of food product, such as for example 0.5-1% (w/w) relative to the total weight of food product.

In some embodiments, the acid-gellable whey protein powder composition or the acid-gellable whey protein suspension is used in low-carbohydrate food products. In other embodiments the acid-gellable whey protein powder composition or the acid-gellable whey protein suspension is used in low-lactose food products, such as for example in lactose free food products. In yet other embodiments the acid-gellable whey protein powder composition or the acid-gellable whey protein suspension is used in low-fat food products.

In some embodiments, the acid-gellable whey protein powder composition or the acid-gellable whey protein suspension is used in low-carbohydrate yoghurts. In other embodiments the acid-gellable whey protein powder composition or the acid-gellable whey protein suspension is used in low-lactose yoghurts, such as for example in lactose free yoghurts. In yet other embodiments the acid-gellable whey protein powder composition or the acid-gellable whey protein suspension is used in low-fat yoghurts.

The food product may furthermore contain one of more non-carbohydrate natural or artificial sweetener.

In some embodiments, the food product contains one or more natural sweetening agent(s) that are not sugars. These natural sweetening agent(s) may be provided as a component of a second sweetening agent, either alone, or in combination with a carbohydrate sweetener, as described. The natural non-sugar sweetening agent(s) may for example be selected from the group consisting of *Momordica Grosvenorii* (Mogrosides IV or V) extracts, Rooibos extracts, Honeybush extracts, *Stevia* extract, Rebaudioside A, thaumatin, Brazzein, Glycyrrhyzic acid and its salts, Curculin, Monellin, Phylloducin, Rubusosides, Mabinlin, dulcoside A, dulcoside B, siamenoside, monatin and its salts (monatin SS, RR, RS, SR), hernandulcin, phyllodulcin, glycyphyllin, phloridzin, trilobatin, baiyunoside, osladin, polypodoside A, pterocaryoside A, pterocaryoside B, mukurozioside, phlomisoside I, periandrin I, abrusoside A, cyclocarioside I, erythritol, isomaltulose and/or natural polyols such as maltitol, mannitol, lactitol, sorbitol, inositol, xylitol, threitol, galactitol and combinations thereof.

In some embodiments, the food product contains one or more artificial sweetening agent(s). These artificial sweetening agent(s) may be provided as a component of the first sweetener, either alone or in combination with other of the sweeteners as defined above. The artificial non-sugar sweetening agent(s) may for example be selected from the group consisting of Aspartame, Cyclamate, Sucralose, Acesulfame K, neotame, Saccharin, Neohesperidin dihydrochalcone, *Stevia* extract, Rebaudioside A, thaumatin, Brazzein, Glycyrrhyzic acid and its salts, Curcutin, Monellin, Phylloducin, Rubusosides, Mabinlin, dulcoside A, dulcoside B, siamenoside, monatin and its salts (monatin SS, RR, RS, SR) and combinations thereof.

In some embodiments of the invention, it is particularly preferred that the sweetener comprises or even consists of one or more high intensity sweeteners (HIS). HIS are both found among the natural and the artificial sweeteners and typically have a sweetening intensity of at least 10 times that of sucrose. Non-limiting examples of useful HIS are Aspartame, Cyclamate, Sucralose, Acesulfame K, neotame, Saccharin, Neohesperidin dihydrochalcone and combinations thereof.

If used, the total amount of HIS is typically in the range of 0.01-2% (w/w). For example, the total amount of HIS may be in the range of 0.05-1.5% (w/w). Alternatively, the total amount of HIS may be in the range of 0.1-1.0% (w/w).

It may furthermore be preferred that the sweetener comprises or even consists of one or more polyol sweetener(s). Non-limiting examples of useful polyol sweetener are maltitol, mannitol, lactitol, sorbitol, inositol, xylitol, threitol, galactitol or combinations thereof.

If used, the total amount of polyol sweetener is typically in the range of 1-20% (w/w). For example, the total amount of polyol sweetener may be in the range of 2-15% (w/w).

Alternatively, the total amount of polyol sweetener may be in the range of 4-10% (w/w).

The food product may furthermore contain carbohydrate-based stabilisers, such as e.g. locust bean gum, guar gum, alginates, cellulose, xanthan gum, carboxymethyl cellulose, microcrystalline cellulose, carrageenans, pectins, inulin and mixtures thereof.

However, an advantage of the present invention is that the level of carbohydrate-based stabilisers can be reduced or even avoided, thus in preferred embodiments of the invention the food product comprises at most 1% (w/w) carbohydrate-based stabilisers, and preferably most 0.1% (w/w) carbohydrate-based stabilisers, and even more preferably no carbohydrate-based stabilisers.

In some embodiments, the food product further comprises fat in addition to the acid-gellable whey protein powder and/or acid-gellable whey protein suspension. The fat may e.g. be present in an amount in the range of 0.1-10% (w/w), such as 0.5-5% (w/w) or 1-3% (w/w). The fat may for example be present in an amount in the range of 0.1-3% (w/w). In other embodiment the amount of fat in the food product is at most 1% (w/w) relative to the total weight of food product, such as for example at most 0.9% (w/w) relative to the total weight of food product, such as for example at most 0.8% (w/w) relative to the total weight of food product, such as for example at most 0.7% (w/w) relative to the total weight of food product, such as for example at most 0.6% (w/w) relative to the total weight of food product, such as for example at most 0.5% (w/w) relative to the total weight of food product. In other embodiments the amount of fat in the food product is 0.1-1% (w/w) relative to the total weight of food product, such as for example 0.3-1% (w/w) relative to the total weight of food product, such as for example 0.5-1% (w/w) relative to the total weight of food product.

In some embodiments, the food product further comprises lactose in addition to the acid-gellable whey protein powder and/or acid-gellable whey protein suspension. In some embodiments, the food product contains lactose as the only type of carbohydrate. Hence, In some embodiments, the amount of lactose in the food product is at most 1% (w/w) relative to the total weight of food product, such as for example at most 0.9% (w/w) relative to the total weight of food product, such as for example at most 0.8% (w/w) relative to the total weight of food product, such as for example at most 0.7% (w/w) relative to the total weight of food product, such as for example at most 0.6% (w/w) relative to the total weight of food product, such as for example at most 0.5% (w/w) relative to the total weight of food product. In other embodiments the amount of lactose in the food product is 0.1-1% (w/w) relative to the total weight of food product, such as for example 0.3-1% (w/w) relative to the total weight of food product, such as for example 0.5-1% (w/w) relative to the total weight of food product.

The food product may furthermore comprise one of more vitamin(s) and similar other ingredients such as vitamin A, vitamin D, vitamin E, vitamin K, thiamine, riboflavin, pyridoxine, vitamin B12, niacin, folic acid, pantothenic acid, biotin, vitamin C, choline, inositol, their salts, their derivatives and combinations thereof.

The food product may furthermore contain salts and minerals which typically are present in whey or milk derived products.

In a particular embodiment, the food product comprises
a total amount of protein of 4.5-5.0% (w/w) relative to the total weight of food product,
1.0-1.5% (w/w) acid-gellable whey protein aggregates relative to the total weight of food product,
at most 0.2% (w/w) fat relative to the total weight of food product, and
5-7% (w/w) lactose relative to the total weight of food product.

In another particular embodiment, the food product comprises
a total amount of protein of 3-7% (w/w) relative to the total weight of food product,
0.2-2.0% (w/w) acid-gellable whey protein aggregates relative to the total weight of food product,
at most 8% (w/w) fat relative to the total weight of food product, and
4-7% (w/w) lactose relative to the total weight of food product.

In yet another particular embodiment, the food product comprises
a total amount of protein of at most 18% (w/w) relative to the total weight of food product,
1-4% (w/w) acid-gellable whey protein aggregates relative to the total weight of food product,
at most 4% (w/w) fat relative to the total weight of food product, and
optionally, 4-8% (w/w) lactose relative to the total weight of food product.

In yet another aspect, the present invention relates to a method of producing a food product. The method comprises the steps of:
1) providing an acid-gellable whey protein powder composition or an acid-gellable whey protein suspension as described herein,
2) combining the acid-gellable whey protein with one or more additional ingredients, and
3) optionally processing the combination.

Hence, some embodiments are directed to a method of producing a yoghurt-like product. Such method may comprise the steps of:
1) providing an acid-gellable whey protein powder composition or an acid-gellable whey protein suspension as described herein,
2) combining said acid-gellable whey protein composition with lactose and optionally further carbohydrates, fat, vitamins and minerals, and optionally homogenizing the mixture and then pasteurising it at a temperature of at least 72 degrees C. for a duration of at least 15 seconds and subsequently cooling the mixture to a temperature below 50 degrees C.,
3) contacting the cooled mixture with an acidifying agent and allowing the acidifying agent to acidify the mixture to a pH of at most 5.0, and optionally packaging the yoghurt-like product derived from the acidified mixture.

The method preferably contains a step of homogenising the mixture. Homogenisation is a well-known process in the art of dairy technology and may e.g. be performed as a one-stage or twostage process. The homogenisation of the mixture may for example be implemented a twostage process, wherein the first stage uses a pressure of 100-300 bar and the second stage uses a pressure in the range of 30-80 bar.

Step 2) also involves heat-treating the mixture by heating it to a temperature of at least 72 degrees C., e.g. in the range of 72-150 degrees C., and maintaining the temperature of the mixture in that range for a duration sufficient to kill a substantial number of the viable microorganisms of the dairy base. Typically at least 99% of the microorganisms are killed during the pasteurisation.

The duration of the heat-treatment depends on the temperature(s) to which the mixture is heated and is typically somewhere between 1 second and 30 minutes.

It is however preferably that the heat-treatment has a bacteria killing effect which is at least equivalent to that of 72 degrees C. for 15 seconds.

For example, the mixture may be heated to one or more temperatures in the range of 72-85 degrees C. for 0.2-30 minutes. The mixture may e.g. be heated to one or more temperatures in the range of 80-95 degrees C. for 0.1-15 minutes. Alternatively, the mixture may be heated to one or more temperatures in the range of 90-110 degrees C. for 2 second-10 minutes. For example, the mixture may be heated to one or more temperatures in the range of 100-150 degrees C. for 1 second-2 minutes.

After the heat-treatment the mixture is cooled, e.g. to a temperature of at most 50 degrees C., preferably even lower such as at most 45 degrees C. or at most 40 degrees C.

The cooled mixture is then contacted with the acidifying agent in step 3).

The acidifying agent may for example be a bacterial culture, typically referred to as a starter culture, in which case the addition of the acidifying agent may be perceived as an inoculation of the cooled mixture, in which case one obtains an inoculated mixture.

Thus, in some embodiments of the invention, the acidifying agent comprises a chemical acidifying agent.

In the context of the present invention the term "chemical acidifying agent" pertains to a chemical compound capable of gradual or instantaneous reduction of the pH of the mixture.

The chemical acidifying agent may for example be a food acceptable acid (also referred to as a food acid) and/or a lactone. Examples of useful acids are carboxylic acids such as citric acid, tartaric acid and/or acetic acid. An example of a useful lactone is glucono delta-lactone (GDL).

In some embodiments, of the invention the chemical acidifying agent comprises one or more components selected from the group consisting of acetic acid, lactic acid, malic acid, citric acid, phosphoric acid or glucono delta-lactone.

The actual concentration of the chemical acidifying agent depends on the specific formulation of the mixture provided in step 2). It is generally preferred that the chemical acidifying agent is used in a sufficient amount to reduce the pH of the mixture to at most pH 5.0, and preferably at most pH 4.8, such as e.g. at most pH 4.6.

In some preferred embodiments of the invention, the acidifying agent comprises, or even is, a starter culture.

In principle, any type of starter culture traditionally used in making yoghurt-type acidified dairy product may be used. Starter cultures used in the dairy industry are normally mixtures of lactic acid bacterial strains, but a single strain starter culture may also be useful in the present invention. Thus, in preferred embodiments, the one or more starter culture organism of the present process is a lactic acid bacterial species selected from the group consisting of *Lactobacillus, Leuconostoc, Lactococcus*, and *Streptococcus*. Commercial starter culture comprising one or more of these lactic acid bacterial species may be useful in the present invention.

Flavouring and/or aromatic agents may be added to the mixture to obtain a flavoured acidified dairy product. Flavours may be added as solids, but are preferably added in the form of liquids. However, often it is preferred that the flavours are added after the acidification.

During step 3) the acidifying agent is allowed to reduce the pH of the mixture of step 2).

If the mixture is an inoculated mixture, it is incubated under conditions permitting the starter culture to become metabolically active to produce the acidified mixture. In some preferred embodiments, the inoculated mixture is incubated at a temperature between 32° C. and 43° C. until the desired pH is reached. The fermentation may be stopped by decreasing the temperature to around 10° C.

If the mixture contains a chemical acidifying agent, the chemical acidifying agent will normally start reducing the pH of the mixture as soon as the chemical acidifying agent forms part of the mixture. Some chemical acidifying agents, such as lactones and slowly dissolving acids, will provide a gradual pH reduction as they react with water or are dissolved.

The temperature of the dairy base during step 3) is typically in the range of 20-50 degrees C., and preferably in the range of 32-45 degrees C.

Step 3) of the method may also involve packaging a yoghurt-like product derived from the acidified mixture.

The packaging of step 3) may involve any suitable packaging techniques, and any suitable container may be used for packaging the whey protein-based, yoghurt-like product.

The packaging of step 3) may for example involve aseptic packaging, i.e. the product is packaged under aseptic conditions. For example, the aseptic packaging may be performed by using an aseptic filling system, and it preferably involves filling the product into one or more aseptic container(s).

Examples of useful containers are e.g. bottles, cartons, bricks, pouches and/or bags.

EXAMPLES

Example 1: Methods of Analysis

Example 1.1: Quantification of Acid-Gellable Whey Protein Aggregates

The amount of acid-gellable whey protein aggregates is determined using the following procedure.

Procedure:

1. Dissolve a sample of approx. 1.00 g powder in phosphate buffer to obtain 1000 mL. If the sample is in the form of a liquid, then a liquid sample containing approx. 1.00 g dry matter is diluted to 1000 mL with phosphate buffer (0.02M $NaH_2PO_4$ pH 7.5). Write down the precise dilution factor (typically close to 1000). Allow the dissolved (or diluted) sample to stand for 24 hours before proceeding to step 2.

2. Determine the amount of total protein (true protein) of the dissolved sample as described in example 1.4. The amount of total protein of the dissolved sample is referred to as "X" (% (w/w) total protein relative to total weight of the dissolved sample).

3. Centrifuge 100 mL of the dissolved sample at 62000 g for 30 minutes. The centrifugation is performed at approx. 15 degrees C. using a refrigerated centrifuge 3-30K from SIGMA Laborzentrifugen GmbH and 85 mL tubes (Order no. 15076) or similar equipment.

4. Collect the resulting supernatant and filter it through a 0.22 micron filter to remove traces of microparticles that could damage the HPLC-column of the following HLPC analysis.

5. Determine the total protein (true protein) of the filtered supernatant by using the procedure disclosed in Example 1.4. The amount of total protein of the filtered supernatant is referred to as "Y" (% (w/w) total protein relative to total weight of the filtered supernatant).

6. Quantify the amount (% (w/w) relative to total weight of the filtered supernatant) of native alpha-lactalbumin, beta-lactoglobulin, and caseinomacropeptide using the procedure described in Example 1.2.

7. Calculate the relative amount of acid-gellable whey protein aggregates (% (w/w) acid-gellable aggregates relative to total amount of protein of the original sample). This can be done using the formula:

$$Z_{Relative\ amount\ of\ acid\text{-}gellable\ aggregates} = ((Y - C_{alpha} - C_{beta} - C_{CMP})/X) * 100\%\ (w/w\ \text{total protein of the original sample})$$

The absolute amount of acid-gellable whey protein aggregates of the original sample is calculated by multiplying the relative amount of acid-gellable whey protein aggregates with X* dilution factor (going from 1 g sample to 1000 mL (=approx. 1000 g) dissolved sample gives a dilution factor of 1000). The formula looks like this:

Absolute amount of acid-gellable whey protein aggregates of the original sample= $Z_{Relative\ amount\ of\ acid\text{-}gellable\ whey\ protein\ aggregates} * X *$ dilution factor Example 1.2: Determination of Native Alpha-Lactalbumin, Beta-Lactoglobulin and CMP The content of native alpha-lactalbumin, beta-lactoglobulin and CMP was analyzed by HPLC analysis at 0.4 ml/min. 25 μl filtered sample is injected onto 2 TSKgel3000PWxl (7.8 mm 30 cm, Tosohass, Japan) columns connected in series with attached precolumn PWxl (6 mm×4 cm, Tosohass, Japan) equilibrated in the eluent (consisting of 465 g MilliQ water, 417.3 g acetonitrile and 1 mL triflouroacetic acid) and using a UV detector at 210 nm.

Quantitative determination of the contents of native alpha-lactalbumin ($C_{alpha}$), beta-lactoglobulin ($C_{beta}$), and caseinomacropeptide ($C_{CMP}$) was performed by comparing the peak areas obtained for the corresponding standard proteins with those of the samples.

Example 1.3: Determination of the Degree of Denaturation

The quantitative analysis of the native whey protein content, i.e. the content of native alpha-lactalbumin, beta-lactoglobulin and caseinomacropeptide, was performed using the procedure described in Example 1.2 and the total protein content was quantified using the procedure described in Example 1.4.

The degree of denaturation was calculated as $(C_{total\ protein} - C_{native\ protein})/C_{total\ protein} * 100\%$, wherein $C_{total\ protein}$ is the weight of total protein and $C_{native\ protein}$ is the weight of native protein.

Example 1.4: Determination of Total Protein

The total protein content (true protein) of a sample is determined by:
1) Determining the total nitrogen of the sample following ISO 8968-1/2|IDF 020-1/2—Milk—Determination of nitrogen content—Part 1/2: Determination of nitrogen content using the Kjeldahl method.
2) Determining the non-protein nitrogen of the sample following ISO 8968-4|IDF 020-4—Milk—Determination of nitrogen content—Part 4: Determination of non-protein-nitrogen content.
3) Calculating the total amount protein as $(m_{total\ nitrogen} - m_{non\text{-}protein\text{-}nitrogen}) * 6.38$.

Example 1.5. Determination of Acid-Gel Strength

The acid-gel strength is determined by the following procedure:
1. Dissolve the protein powder in water and make 400 ml of suspension containing 3% protein w/w in water.
2. Stir the suspension for 1 hour using a magnetic bar stirrer.
3. Leave the suspension overnight in refrigerator.
4. Homogenise the refrigerated suspension at 200 bars.
5. Store 100 mL of the suspension at 42 degrees C. for 30 minutes.
6. Add GDL (glucono-delta-lactone) to obtain a concentration of 0.6% (w/w) GDL and stir for 5 minutes using a magnetic bar stirrer.
7. Add samples to
  a) tube for pH logger and
  b) Rheometer (MCR301 from Anton Paar with CC27 measuring system).
Rheometer program:
Oscillation frequency: 1 Hz
Temperature profile:
  42 degrees C. for 330 minutes
  Cooling from 42 to 20 degrees C. in 20 minutes
  Cooling from 20 to 5 degrees C. in 120 minutes
  i.e. total time in rheometer is 470 minutes The storage modulus (Pa) is automatically measured every minute and the sample pH (from the pH logger) is measured every 5 minutes.

The acid-gel strength is read as the storage modulus (Pa) after cooling to 5 degrees, i.e. the storage modulus (Pa) after 470 minutes.

Example 1.6. Determination of Loose Density and Bulk Density

The density of a dry powder is defined as the relation between weight and volume of the powder which is analysed using a special Stampf volumeter (i.e. a measuring cylinder) under specified conditions. The density is typically expressed in g/ml or kg/L.

In this method a sample of dried powder is tamped in a measuring cylinder. After a specified number of tappings the volume of the product is read and the density is calculated.

Three types of densities can be defined by this method:
Poured density, which is the mass divided with the volume of powder after it has been transferred to the specified measuring cylinder.
Loose density, which is the mass divided with the volume of powder after 100 tappings according to the specified conditions in this standard.
Bulk density, which is the mass divided with the volume of powder after 625 tappings according to the specified conditions in this standard.

The method uses a special measuring cylinder, 250 ml, graduated 0-250 ml, weight 190±15 g (3. Engelsmann A. G. 67059 Ludwigshafen/Rh) and a Stampf volumeter, e.g. 3. Engelsmann A. G.

The loose density and the bulk density of the dried product are determined by the following procedure.

Pre-Treatment:

The sample to be measured is stored at room temperature.

The sample is then thoroughly mixed by repeatedly rotating and turning the container (avoid crushing particles). The container is not filled more than ⅔.

Procedure:

Weigh 100.0±0.1 gram of powder and transfer it to the measuring cylinder. The volume $V_0$ is read in ml.

If 100 g powder does not fit into the cylinder, the amount should be reduced to 50 or 25 gram.

Fix the measuring cylinder to the Stampf volumeter and let it tap 100 taps. Level the surface with the spatula and read the volume $V_{100}$ in ml.

Change the number of tabs to 625 (incl. the 100 taps). After tapping level the surface and read the volume $V_{625}$ in ml.

Calculation of Densities:

Calculate the loose and the bulk densities expressed in g/ml according to the following formula:

$$M/V$$

where M designates weighed sample in grams and V designates volume after 100 tappings ($V_{100}$) or 625 tappings ($V_{625}$), respectively, in ml.

Example 1.7. Determination of Insolubility Index

The insolubility index is a measure for the ability of a powder to dissolve in water.

The method is normally used for dry milk products, such as skimmed milk, whole milk and sweet buttermilk powder, but can also be applied to other soluble dried dairy products.

The insolubility index is defined as the volume of sediments in ml that is left after dissolving and centrifugation of the powder and is a measure for the milk powder's ability to dissolve in water (reconstitute). Normally, spray dried powder has a solubility index of <1.25 ml, while roller dried powder that is less soluble than spray dried powder can have an index of 15-18 ml.

In the method the powder is dissolved in water at a certain temperature and centrifuged. The supernatant is removed and replaced by water and centrifuged again before reading the volume of insoluble residue.

Procedure

Weigh out 10.0 grams powder.

Weigh out 100 ml demineralised water (24 degrees C.) in a graduated cylinder and pour it into a mixing jar which is temperature adjusted in water bath.

Add the powder to the mixing jar together with 3 drops of antifoam agent.

Place the mixing jar in a Waring mixer and mix for exactly 90 seconds at a speed of 3000-3500 rpm.

Leave the sample for at least 5 minutes but not more than 15 minutes.

Mix for 5 seconds with a spatula (not too vigorously) and fill up the centrifuge tube to the 50 ml mark.

Centrifuge the sample for 5 minutes at 900 rpm using a rotor head having a rotor diameter of 14.2".

Immediately after the centrifuging, the supernatant must be sucked up so that there are only 5 ml left above the sediment. The sediment must not be stirred up.

Fill up the tube with demineralised water (24 degrees C.) to the 30 ml mark, shake the centrifuge tube carefully so that the sediment is loosened, use a metal thread if necessary. Mix well hereafter. Fill up with demineralised water (24 degrees C.) to the 50 ml mark carefully again.

Centrifuge again for 5 minutes at 900 rpm using a rotor head having a rotor diameter of 14.2".

Determination of Insolubility Index:

The insolubility index is determined using the formula:

Insolubility index=ml sediment

Hold the centrifuge tube vertically at eye level and read the volume of the sediment in ml. Read the nearest marking. In order to make the reading easier, it can be done in front of a strong light source and a magnifying glass can be used if necessary.

Example 1.8. Quantification of the Amount of Insoluble Whey Protein Microparticles The amount of insoluble whey protein particles having a particles size in the range of 1-10 micron of a denatured whey protein composition is determined using the following procedure:

1. Make a 5% (w/w in water) suspension of the sample to be tested.

2. Let the resulting suspension rehydrate for one hour with gentle agitation (stirring).

3. Homogenize the suspension at 200 bar.

4. Centrifuge a first portion of the suspension at 15000 g for 5 minutes.

5. Collect the resulting supernatant and analyse for total protein (true protein). The amount of total protein of the supernatant is referred to as "A".

6. Analyse a second portion of the suspension (not subjected to centrifugation) for total protein (true protein). The amount of total protein of the suspension is referred to as "B".

7. Subject a third portion of the suspension to particle size distribution analysis by static light scattering and determine the percentage by volume of the particles that has a particle size >10 micron, this percentage is referred to "C".

8. Determine the amount (% w/w relative to total protein) of insoluble whey protein particles having a particle size the range of 1-10 micron as:

$$P_{1-10}=(((B-A)/B)*100\%)-C$$

9. Repeat steps 4-5, but centrifuging at 3000 g for 5 minutes instead of 15000 g. (only the largest part of the particles will be removed). The total protein of the supernatant of step 9 is referred to as "D".

10. Determine the amount (% w/w relative to total protein) of insoluble whey protein particles having a particle size in the range of 0.5-1.5 micron as:

$$((D-A)/B)*100\%$$

The procedure is performed at approx. 15 degrees C. using a refrigerated centrifuge 3-30K from SIGMA Laborzentrifugen GmbH and 85 mL tubes (Order no. 15076), in which the 5% suspension is filled so that the total weight of tube and sample amounts to 96 g.

Particle size distribution analysis is performed using a Malvern Mastersizer (Micro Particle Sizer, Malvern Instruments Ltd., Worcestershire, UK).

Parameters: Particle refractive index 1.52 (real part), 0.1 (imaginary part) and dispersant refractive index 1.33 were used.

Data analysis: The data was fitted using the Mie scattering model (residuals<2%).

Example 1.9.1. Determination of the Amount of Free Calcium

The concentration of free calcium can be determined by using a calcium ion selective electrode such as for example a Calcium ionplus Combination IS from Thermo Fisher Scientific Inc., Beverly, USA or Radiometer Analytical ISE25Ca-9 Calcium Ion Selective Electrode from Radiometer Analytical SAS, Villeurbanne Cedex, France.

Equipment required for determining the concentration of free calcium using a calcium ion selective electrode includes:

1. Ion Selective electrode meter, from for example Thermo Scientific Orion ISE meter or Radiometer analytical PHM250 ion analyser.
2. Calcium ion selective electrode (as mentioned above).
3. Magnetic stirrer.
4. Volumetric flasks, graduated cylinders and beakers. Plastic labware is required for low level calcium analysis.
5. Distilled or deionized water.
6. Calcium electrode filling solution.
7. 0.1 M $CaCl_2$ calcium calibration standard.
8. Calcium ionic strength adjuster (ISA). ISA provides a constant background ionic strength for samples and standards.

Direct Calibration Technique

It is recommended to use the direct calibration technique when determining the free calcium content in the demineralised whey protein solution.

The direct calibration technique is a simple procedure. Only one meter reading is required for each sample. Calibration is performed using a series of standards. The concentration of the samples is determined by comparison to the standards. ISA is added to all solutions to ensure that samples and standards have similar ionic strength.

In the direct calibration procedure, a calibration curve is constructed either in the meter memory or on semi-logarithmic paper. Electrode potentials of standard solutions are measured and plotted on the linear axis against their concentrations on the log axis. In the linear regions of the curves, only two standards are needed to determine a calibration curve. In non-linear regions, more points must be taken. The direct calibration procedure is given for concentrations in the region of linear electrode response. The linear range of the electrode is typically found for concentrations greater than 0.4 ppm corresponding to $10^{-5}$ M calcium.

A two point calibration is sufficient, although more points can be used. When using an ISE meter, sample concentrations can be read directly from the meter. When using a mV meter a calibration curve can be prepared on semi-logarithmic graph paper or a linear regression (against logarithmic concentration values) can be performed using a spreadsheet or graphic program.

Calibration Hints:

The concentration of the standards used to make the calibration curve should bracket the expected sample concentrations.

If the ionic strength in the samples is high, i.e. 0.1 M or greater, then the standards should be prepared with background similar to that of the samples, or the samples should be measured using the standard addition method.

During calibration the least concentrated standard should be measured as the first standard and then work up to the most concentrated standard.

Direct Calibration Setup

Prepare the electrode as described by the manufacturer and connect the electrode to the meter. Then at least two standards are prepared. The standards should bracket the expected sample range and differ in concentration by a factor of ten. The standards can be prepared in any concentration unit to suit the particular analysis requirement. It is important, however, that all standards should be at the same temperature as the samples. In the present application all standards and samples are measured at 25 degrees C.

Direct Calibration Procedure Using a Meter with an ISE Mode

1. Add 100 ml of the less concentrated standard and 2 ml of ISA to a 150 ml beaker and stir the solution thoroughly.
2. Rinse the electrode with distilled water, blot it dry and place it into the beaker with the less concentrated standard. Wait for a stable reading and adjust the meter to display the value of the standard.
3. Add 100 ml of the more concentrated standard and 2 ml of ISA to a second 150 ml beaker and stir the solution thoroughly.
4. Rinse the electrode with distilled water, blot it dry and place it into the beaker with the more concentrated standard. Wait for a stable reading and adjust the meter to display the value of the second standard.
5. Record the resulting slope value. The slope should be between 25 and 30 mV when the standards are between 20 and 25 degrees C.
6. Add 100 ml of sample and 2 ml of ISA to a clean 150 ml beaker and stir the solution thoroughly.
7. Rinse the electrode with distilled water, blot it dry and place it into the sample. The concentration of the sample will be displayed on the meter.

Note: Other solution volumes may be used, as long as the ratio of solution to ISA remains 50:1.

Direct Calibration Procedure Using a Meter with mV Mode

1. Set the meter to the mV mode.
2. Add 100 ml of the less concentrated standard and 2 ml of ISA to a 150 ml beaker and stir the solution thoroughly.
3. Rinse the electrode with distilled water, blot it dry and place it into the beaker with the less concentrated standard. When a stable reading is displayed, record the mV value and corresponding standard concentration.
4. Add 100 ml of the more concentrated standard and 2 ml of ISA to a second 150 ml beaker and stir the solution thoroughly.
5. Rinse the electrode with distilled water, blot it dry and place it into the beaker with the more concentrated standard. When a stable reading is displayed, record the mV value and corresponding standard concentration.
6. Using semi-logarithmic graph paper, prepare a calibration curve by plotting the millivolt values on the linear axis and the standard concentration values on the logarithmic axis.
7. Add 100 ml of sample and 2 ml of ISA to a clean 150 ml beaker and stir the solution thoroughly.
8. Rinse the electrode with distilled water, blot it dry and place it into the sample. When a stable reading is displayed, record the mV value.
9. Using the calibration curve prepared in step 6, determine the unknown concentration of the sample.

Note: Other solution volumes may be used, as long as the ratio of solution to ISA remains 50:1.

Example 1.9.2. Determination of the Amount of Free Magnesium

The concentration of free magnesium can be determined by using the procedure described in Example 1.9.1 except that a magnesium ion selective electrode and magnesium calibration standard must be employed instead of a calcium ion selective electrode and standard. As an example of a suitable magnesium selective electrode is the DX224-Mg Magnesium half-cell from Mettler, Toledo.

Example 1.10: Determination of the Water Content of a Powder

The water content of a food product is determined according to ISO 5537:2004 (Dried milk—Determination of moisture content (Reference method)). NMKL is an abbreviation for "Nordisk Metodikkomité for Næingsmidler".

Example 1.11.1.: Determination of Ash Content

The ash content of a food product is determined according to NMKL 173:2005 "Ash, gravimetric determination in foods".

Example 1.11.2.: Determination of the Total Amount of Calcium and Total Amount of Magnesium, Respectively The total amount of calcium and the total amount of magnesium can be determined using a procedure in which the samples are first decomposed using microwave digestion and then the total amount of mineral(s) is determined using an ICP apparatus.

Apparatus:
The microwave is from Anton Paar and the ICP is an Optima 2000DV from PerkinElmer Inc.
Materials:
1 M HNO3
Yttrium in 2% HNO3
Calcium standard: 1000 micrograms/mL in 5% HNO3
Magnesium standard: 100 micrograms/mL in 5% HNO3
Pre-Treatment:
Weigh out a certain amount of powder and transfer the powder to a microwave digestion tube. Add 5 mL 1M HNO3. Digest the samples in the microwave in accordance with microwave instructions. Place the digested tubes in a fume cupboard, remove the lid and let volatile fumes evaporate.
Measurement Procedure:
Transfer pre-treated sample to digitube using a known amount of Milli-Q water. Add a solution of yttrium in 2% HNO3 to the digitube (about 0.25 mL per 50 mL diluted sample) and dilute to known volume using Milli-Q water. Analyze the samples on the ICP using the procedure described by the manufacturer.
A blind sample is prepared by diluting a mixture of 10 mL 1M HNO3 and 0.5 mL solution of yttrium in 2% HNO3 to a final volume of 100 mL using Milli-Q water.
At least 3 standard samples are prepared having concentrations which bracket the expected sample concentrations.

Example 1.12: Determination of the Total Amount of Lactose

The total amount of lactose is determined according to ISO 5765-2:2002 (IDF 79-2: 2002) "Dried milk, dried ice-mixes and processed cheese—Determination of lactose content—Part 2: Enzymatic method utilizing the galactose moiety of the lactose".

Example 1.13: Determination of Viscosity in Food Products

The viscosity of liquid products was measured on a rheometer (Haake rheostress) with a bob/cup system.

The measurement was performed at 5 degrees C. (both the temperature of the liquid sample and the relevant parts of the rheometer had a temperature of 5 degrees C.).

Procedure:
1. Sample Preparation
Each sample is filled into bottles during processing and placed in the laboratory cooler (5° C.) to temperate for 1 day.
2. Setup
Set up the program for measurement of the product on the Haake rheostress, see method setup.
Install the bob/cup system. Check that the temperature of the water bath for HAAKE rheostress is set at 1° C., if not adjust the temperature.
3. Measuring
Only the sample that is to be analysed is removed from the cool storage, the sample bottle is gently turned upside down 3 times to homogenise the sample if it is phase separated during storage. Add 40 ml sample to the cup and start the data-sampling programme. A double repetition is made.
4. Cleaning
When the analysis is finished, dismantle the bob/cup system and clean it with water and soap and afterwards with cold water to temperate the system before the next measurement. Wipe the bob/cup system and install it again for the next sample.
Results:
The viscosity is presented in the unit centipoise (cP). Based on the cP-value read after 90 sec. (t(seq)), an average of the double repetition is calculated. The higher the measured cP values are, the higher the viscosity.
Materials:
For this procedure the following is required:
Haake rheostress 1 rheometer
Bob: Z34 DIN 53019 series
Cup: Z34 DIN53018 series probes
Water bath Haake K20/Haake DC50
Method Setup:
The parameters for the programme were as follows:
Step 1: Measurement position
Step 2: Controlled Stress of 1.00 Pa for 30 sec. at 5.00° C. Frequency of 1.000 Hz. 2 data points are collected
Step 3: Controlled Rate of 50.00 I/s for 120 sec. at 5.00° C. 30 data points are collected
Step 4: Lift apart

Example 1.14: Determination of Viscosity in Concentrated Suspensions of Acid-Gellable Whey Protein Aggregates The viscosity of liquid products was measured on a rheometer (Anton Paar MCR 301) with a coaxial double gap (DG26.7) measuring system.
The measurement was performed at 10 degrees C. (both the temperature of the liquid sample and the relevant parts of the rheometer had a temperature of 10 degrees C.).
Procedure:
1. Sample Preparation
Each sample is filled into bottles during processing, transferred to the rheometer and temperature equilibrated for 5 minutes before measuring.
2. Setup
Set up the program for measurement of the product on the Anton Paar Physica MCR 301, see method setup.
Install the DG26.7 double gap system. Check that the temperature of the water bath for the rheometer is set at 5° C., if not adjust the temperature.

3. Measuring 3.8 mL of sample is transferred from bottle to cup using a pipette. Start the data-sampling programme.

4. Cleaning

When the analysis is finished, dismantle the measuring system and clean it with water and soap and afterwards with cold water to temperate the system before the next measurement. Wipe the measuring system and install it again for the next sample.

Results:

The viscosity is presented in the unit centipoise (cP). Based on the cP-value read at 300 s$^{-1}$. The higher the measured cP values are, the higher the viscosity.

Materials:

For this procedure the following is required:
Anton Paar Physica MCR301 rheometer
DG26.7 double gap system
Julaba F12 temperature controlled water bath Method Setup:

The parameters for the programme were as follows:
Step 1: Go to measurement position (0.5 mm)
Step 2: Linear shear sweep from 0.2 to 300 s$^{-1}$ (60 pts)
Step 3: Lift apart

Example 2. Preparation of Acid-Gellable Whey Protein Powder

Two samples of acid-gellable whey protein powders were produced and compared with a reference sample comprising no, or very little, acid-gellable whey proteins.

The feed was a UF retentate of sweet whey (23% (w/w) protein and 28% (w/w) dry matter).

37.500 kg feed was diluted to a total dry matter content of 8% (w/w) using tap water and then subjected to ion exchange using a weak cation exchange material (IMAC HP336 from Rohm and Haas Company) in order to demineralise the feed. The demineralised feed was collected and divided into 2 portions.

One portion of demineralised feed was diluted to a protein concentration of about 5% and pH was then adjusted to approx. 7 using 5% HCl. Thereafter the solution was heated to 80 degrees C. for 15 minutes. The heat-treated demineralised feed was then cooled to 10 degrees C. and divided into two samples. One sample was mixed with feed (23% (w/w) protein and 28% (w/w) dry matter) in a protein weight ratio of 1:1 (i.e. 12.500 kg of heat-treated ion exchanged feed was mixed with 2.700 kg feed), and the other sample was mixed with feed in a protein weight ratio of 4:1 (i.e. 12.500 kg of heat-treated ion exchanged feed was mixed with 650 kg feed). The two samples were subjected to RO/NF concentration and then stored in a tank over night at 10 degrees C. The next day the samples were spray dried. In the text below these samples are referred to as Sample A (protein weight ratio of 1:1) and Sample B (protein weight ratio of 4:1).

The storage tank in which the samples were stored over night was a 25000 L tank having an inner diameter of 2.865 m and equipped with 3 impellers with a diameter in the range of 0.6-0.8 m. The gentle stirring mode was performed as follows: 5 minutes of stirring at 38 resolution per minute and then 30 seconds of no stirring.

The other portion of demineralised feed was not heat-treated but only subjected to RO/NF, stored in a tank with gentle stirring over night at 10 degrees C. and then spray dried. The dried powder is referred to in the text below as Sample C.

The samples were analysed and the results are shown in the table below.

|  | Sample A | Sample B | Sample C |
|---|---|---|---|
| Dry matter (% w/w) | 95.1 | 95.2 | 95.0 |
| Protein (% w/w) | 79.4 | 79.8 | 78.7 |
| Alpha-lactalbumin (% w/w) | 6.0 | 4.9 | 6.8 |
| Beta-lactoglobulin (% w/w) | 25.2 | 17.1 | 34.7 |
| CMP (% w/w) | 11.0 | 11.6 | 9.3 |
| Degree of denaturation (% w/w relative to total protein) | 47 | 58 | 10 |
| Acid-gellable whey protein aggregates (% w/w relative to total protein) | 38 | 50 | <2% |
| pH | 7 | 7 | 7 |
| Ash | 3.8 | 3.7 | 3.7 |
| Undissolved matter (% v/v) | 0.1 | 0.1 | 0.1 |

The acid-gel strength (measured as described in Example 1.5) of the powders can be characterised as:

Acid-Gel Strength:

|  | Sample A | Sample B | Sample C |
|---|---|---|---|
| Storage modulus (Pa) after cooling to 10 degrees C. | 128 | 403 | 1.6 |
| pH start | 7 | 7 | 7 |
| pH end | 4.4 | 4.0 | 4.4 |

CONCLUSION

The acid-gel strength results reveal that the sample containing almost no acid-gellable whey protein aggregates (Sample C) possesses very low, i.e. almost none, acid-gel strength. The results also reveal that Sample B, which contains 50% acid-gellable whey protein aggregates relative to the total content of protein, show a much higher acid-gel strength (403 Pa) than Sample A (128 Pa), which contain 38% acid-gellable whey protein aggregates relative to the total content of protein. It is therefore concluded the higher content of acid-gellable whey protein aggregates in a sample, the higher acid-gel strength can be obtained.

Moreover, no structure formation or agglomeration of whey protein aggregates was observed during the storage in the storage tank.

Example 3

Preparation of Sample 1

A whey protein concentrate containing 9% dry matter (7% protein of which 70% is denaturable protein, 0.4% lactose, 0.6% fat, 0.03% total calcium (analysed as outlined in Example 1.11.2) from cheese production was demineralized by a weak acid cation exchanger (IMAC HP336) at 10 degrees C. Then the demineralized whey protein concentrate was diluted to 6% protein (of which 70% is denaturable analysed as given in Example 1.2) by use of demineralized water and adjusted to pH 7. The raw material was then heat-treated in a plate heat exchanger to 90 degrees C. for 10 minutes and afterwards held at 50 degrees C.

The heat-treated retentate was concentrated by ultrafiltration (KOCH HFK-328) at 50 degrees C. to 14% dry matter (12% protein of which 62% was acid-gellable whey protein aggregates providing a total amount of acid-gellable whey protein aggregates of 7.2%—analysed as outlined in Example 1.1).

The UF retentate was held at 50 degrees C. prior to the spray drying process. The viscosity of the concentrate was already very high immediately after the ultrafiltration and increased markedly during storage, and therefore shear was applied in the buffer tank. After 2 hours, the storaged concentrate suspension was gelled, despite a maximum shear in the tank. It was not possible to dry the concentrate due to gelation.

Preparation of Sample 2

A demineralized whey protein concentrate having a pH and composition comparable to that used for Sample 1 was heat-treated at 90 degrees C. for 10 minutes and afterwards held at 10 degrees C. The heat-treated retentate was concentrated by ultrafiltration (KOCH HFK-328) at 10 degrees C. to approximately the same concentration of acid-gellable whey protein aggregates as in Sample 1. The UF retentate held at 10 degrees C. was used as a feed for the spray drying process. The viscosity of the concentrate increased to a lesser extent than for Sample 1 during 2 hours of storage at 10 degrees C. After 2 hours, the stored concentrate was still liquid and suitable for drying.

Results

Samples 1 and 2 were evaluated during the first 2 hours after concentration and the results are provided in Table 1.

TABLE 1

Effect of duration and holding temperature after concentration. The observations are made after a duration of 0 and 2 hours. 0 hour corresponds to immediately after the concentration. The production of sample 1 involved UF concentration at 50 degrees C. and subsequently storage of the UF retentate at 50 degrees C. The production of sample 2 involved UF concentration at 10 degrees C. and subsequent storage of the UF retentate at 10 degrees C.

| Duration (hours) | Sample 1 (storage at 50 degrees C.) | Sample 2 (storage at 10 degrees C.) |
| --- | --- | --- |
| 0 | Very viscous and too thick for further processing | Liquid and suitable for further processing |
| 2 | Gelled and not fit for further processing | Liquid and suitable for further processing |

CONCLUSION

The results show that a concentration at 50 degrees C. is not suitable for the processing of acid-gellable whey protein aggregates produced under the given conditions. However, a concentration and storage at 10 degrees C. were surprisingly found to be suitable.

These findings, both the problems observed at 50 degrees C. and the solution of using low temperatures during storage, are contrary to the teachings of US 2008/0305235.

Example 4

A demineralized whey protein concentrate (7% dry matter, 6% protein of which 64% was denaturable, 0.4% lactose, 0.5% fat, pH 7) was heat-treated at 82 degrees C. for 21 min in a plate heat exchanger and afterwards held at 10 degrees C. 62% of the protein in the heat-treated retentate was acid-gellable whey protein aggregates analysed as outlined in Example 1.1. The heat-treated retentate was concentrated by UF at 10 degrees C. to varying contents of acid-gellable whey protein aggregates to provide samples 1-5. The samples were stored at 20 degrees C. and the viscosity was measured after 0, 2 and 21 hours after the UF concentration using the method outlined in Example 1.14. The results are shown in Table 2 below.

TABLE 2

Effect of the concentration of acid-gellable aggregates in the concentrate on the viscosity of the concentrated suspension. Viscosity results are average of 3 measurements (the standard deviation is shown in brackets).

| Sample | agWPA (% w/w) | Viscosity after different durations at 20 degrees C. (cP at 300 s$^{-1}$, measured at 10 degrees C.) | | | Observations |
| --- | --- | --- | --- | --- | --- |
| | | 0 hours | 2 hours | 21 hours | |
| 1 | 3.6 | 4 (0.25) | 4 (0.19) | 5 (0.33) | Liquid after 21 hours |
| 2 | 4.7 | 8 (0.13) | 7 (0.11) | 8 (0.23) | Liquid after 21 hours |
| 3 | 5.6 | 11 (1.10) | 12 (0.29) | 16 (0.38) | Liquid after 21 hours |
| 4 | 6.4 | 24 (0.12) | 29 (0.31) | 61 (1.16) | Liquid after 21 hours |
| 5 | 6.7 | 32 (0.35) | 41 (0.56) | 205 (2.65) | Liquid after 21 hours | agWPA = acid-gellable whey protein aggregates.

The inventors have furthermore seen indications that significantly higher concentrations of acid-gellable whey protein aggregates can be kept liquid a low temperature. In these cases, it has been found advantageous to shorten the duration between the concentration step and the subsequent use of the concentrated suspension, e.g. for drying or used in a specific application.

CONCLUSION

The results clearly demonstrate that it is possible to produce concentrated acid-gellable whey protein aggregate products using a temperature of at most 30 degrees C.

The invention claimed is:

1. A method of preparing an acid-gellable whey protein composition said method comprising the steps of:
   a) providing a demineralised solution comprising 1-15% (w/w) native, denaturable whey protein and having a pH in the range of 6-9,
   b) heat-treating the demineralised solution of step a) to a temperature of at least 68 degrees C. for at most 2 hours, thereby obtaining a suspension comprising acid-gellable whey protein aggregates,
   c) cooling the suspension of step b) to a temperature of at most 30 degrees C.,
   d) concentrating the suspension obtained in step c) to a concentration of acid-gellable whey protein aggregates of at least 4% (w/w), and if the cooled suspension of step c) already contains at least 4% (w/w) acid-gellable whey protein aggregates then step d) increases the concentration of the acid-gellable whey protein aggregates by at least 10% relative to the concentration of acid-gellable whey protein aggregates in the cooled suspension of step c),
   e) drying the concentrated suspension,
   wherein:
      the temperature of the concentrated suspension of step d) is maintained at at most 30 degrees C. until the concentrated suspension is subjected to the drying of step e), and
      the duration between the concentration of step d) and the drying of step e) is at most 48 hours.
2. The method according to claim 1, wherein the duration between the concentration of step d) and the drying of step e) is at most 36 hours.

3. The method according to claim 1, wherein the demineralised solution comprises 3-15% (w/w) native, denaturable whey protein.

4. The method according to claim 1, wherein the demineralised solution has a pH in the range of 6-8.

5. The method according to claim 1, wherein the suspension is concentrated until a concentration of acid-gellable whey protein aggregates of at least 6% (w/w) is obtained.

6. The method according to claim 1, wherein the concentrated suspension obtained in step d) is produced by subjecting the suspension to ultrafiltration, nanofiltration and/or reverse osmosis.

7. The method according to claim 1, wherein the cooled suspension of step c) is mixed with native whey protein before concentrating the suspension in step d) or the concentrated suspension of step d) is mixed with native whey protein before drying the concentrated suspension in step e).

8. The method according to claim 1, wherein the total amount of combined calcium and magnesium in the demineralised solution of step a) is at most 120 mmol/kg dry weight.

9. The method according to claim 1, wherein the temperature of the concentrated suspension of step d) is maintained at at most 20 degrees C. until the concentrated suspension is either subjected to the drying of step e).

10. The method according to claim 1, wherein the concentrated suspension of step d) is sent directly to step e) without any intermediate storage.

11. The method according to claim 1, wherein the duration between the concentration of step d) and the drying of step e) is at most 1 hour.

12. The method according to claim 1, wherein the duration between the concentration of step d) and the drying of step e) is at most 0.5 hour.

13. The method according to claim 1, wherein the acid-gellable whey protein composition is a dry powder.

14. A method of preparing a food product said method comprising the steps of:
 a) providing a demineralised solution comprising 1-15% (w/w) native, denaturable whey protein and having a pH in the range of 6-9,
 b) heat-treating the demineralised solution of step a) to a temperature of at least 68 degrees C. for at most 2 hours, thereby obtaining a suspension comprising acid-gellable whey protein aggregates,
 c) cooling the suspension of step b) to a temperature of at most 30 degrees C.,
 d) concentrating the suspension obtained in step c) to a concentration of acid-gellable whey protein aggregates of at least 4% (w/w), and if the cooled suspension of step c) already contains at least 4% (w/w) acid-gellable whey protein aggregates then step d) increases the concentration of the acid-gellable whey protein aggregates by at least 10% relative to the concentration of acid-gellable whey protein aggregates in the cooled suspension of step c), and
 subsequently using the concentrated suspension of acid-gellable whey protein aggregates of step d) as an ingredient in the production of the food product,
 wherein:
  the temperature of the concentrated suspension of step d) is maintained at at most 30 degrees C. until the subsequent use of the concentrated suspension, and
  the duration between the concentration of step d) and the subsequent use of the concentrated suspension is at most 48 hours.

15. The method according to claim 14, wherein the duration between the concentration of step d) and the subsequent use is at most 36 hours.

16. The method according to claim 14, wherein the demineralised solution comprises 3-15% (w/w) native, denaturable whey protein.

17. The method according to claim 14, wherein the demineralised solution has a pH in the range of 6-8.

18. The method according to claim 14, wherein the suspension is concentrated until a concentration of acid-gellable whey protein aggregates of at least 6% (w/w) is obtained.

19. The method according to claim 14, wherein the concentrated suspension obtained in step d) is produced by subjecting the suspension to ultrafiltration, nanofiltration and/or reverse osmosis.

20. The method according to claim 14, wherein the cooled suspension of step c) is mixed with native whey protein before concentrating the suspension in step d) or the concentrated suspension of step d) is mixed with native whey protein before subsequent use of the concentrated suspension.

21. The method according to claim 14, wherein the total amount of combined calcium and magnesium in the demineralised solution of step a) is at most 120 mmol/kg dry weight.

22. The method according to claim 14, wherein the temperature of the concentrated suspension of step d) is maintained at at most 20 degrees C. until the concentrated suspension is used.

23. The method according to claim 14, wherein the concentrated suspension of step d) is immediately after the end of step d) without any intermediate storage.

24. The method according to claim 14, wherein the duration between the concentration of step d) and the subsequent use is at most 1 hour.

25. The method according to claim 14, wherein the duration between the concentration of step d) and the subsequent use is at most 0.5 hour.

* * * * *